United States Patent
Tilekar et al.

(10) Patent No.: US 10,086,998 B1
(45) Date of Patent: Oct. 2, 2018

(54) CYLINDRICAL SORTATION SYSTEMS AND METHODS

(71) Applicant: Amazon Technologies, Inc., Seattle, WA (US)

(72) Inventors: Akshay Tilekar, Seattle, WA (US); Emily Dunne, Seattle, WA (US); Samuel Gardner Garrett, Seattle, WA (US); Timothy Alan Talda, Seattle, WA (US); Unnikrishnan Vadakkanmaruveedu, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/655,446

(22) Filed: Jul. 20, 2017

(51) Int. Cl.
*B07C 3/08* (2006.01)
*B65G 1/04* (2006.01)
*B65G 1/06* (2006.01)
*B65G 1/12* (2006.01)
*B65G 1/137* (2006.01)

(52) U.S. Cl.
CPC ............... *B65G 1/045* (2013.01); *B07C 3/08* (2013.01); *B65G 1/06* (2013.01); *B65G 1/12* (2013.01); *B65G 1/1373* (2013.01)

(58) Field of Classification Search
CPC .. B07C 3/008; B07C 3/02; B07C 3/04; B07C 3/08; B07C 3/082; B07C 3/087; B65G 1/045; B65G 1/12; B65G 1/127; B65G 1/137; B65G 1/1373; B65G 1/14
See application file for complete search history.

(56) References Cited

U.S. PATENT DOCUMENTS

| | | | | |
|---|---|---|---|---|
| 3,378,151 A * | 4/1968 | Salloum | ............ | E04H 6/28 414/233 |
| 3,554,391 A * | 1/1971 | Goodell | ............ | B65G 1/045 186/57 |
| 3,884,370 A * | 5/1975 | Bradshaw | ............ | B07C 3/087 198/350 |
| 4,067,459 A * | 1/1978 | Rozengauz | ............ | B07C 3/04 209/900 |

(Continued)

OTHER PUBLICATIONS

Twisted Sifter, "Volkswagen's 800-Vehicle Car Towers in Germany," Jan. 15, 2012, URL: http://twistedsifter.com/2012/01/volkswagen-car-towers-in-germany/, 8 pages.

*Primary Examiner* — Joseph C Rodriguez
(74) *Attorney, Agent, or Firm* — Athorus, PLLC

(57) ABSTRACT

Sortation systems and methods are described, in which the sortation systems may include a cylindrical sortation tower. The cylindrical sortation tower may include a plurality of sortation levels, and each of the sortation levels may include a plurality of sortation positions arranged around a periphery of the level. Each sortation position may include a sortation container. The cylindrical sortation tower may also include one or more horizontal tracks and vertical tracks, and each of the sortation levels may further include a circumferential track. Shuttles may traverse the horizontal, vertical, and circumferential tracks to transport items to desired sortation containers. Further, robotic arms may remove completed sortation containers from and add empty sortation containers to the cylindrical sortation tower.

20 Claims, 12 Drawing Sheets

(56) References Cited

U.S. PATENT DOCUMENTS

| | | | | | |
|---|---|---|---|---|---|
| 4,232,988 | A | * | 11/1980 | Kochanneck | A47B 49/008 312/202 |
| 4,252,488 | A | * | 2/1981 | Kochanneck | A47B 49/008 312/202 |
| 4,963,251 | A | * | 10/1990 | Bohm | B07C 1/04 198/370.03 |
| 5,964,374 | A | * | 10/1999 | Yuyama | G07F 11/10 221/10 |
| 6,004,091 | A | * | 12/1999 | Roth | E04H 6/282 414/253 |
| 6,924,451 | B2 | * | 8/2005 | Hanson | B07C 3/02 209/584 |
| 7,138,596 | B2 | * | 11/2006 | Pippin | B07C 3/02 209/584 |
| 7,289,879 | B2 | * | 10/2007 | William | G07F 11/165 700/235 |
| 9,227,227 | B2 | * | 1/2016 | Stemmle | B07C 3/00 |
| 9,481,518 | B2 | * | 11/2016 | Neiser | B65G 1/1378 |
| 9,821,960 | B2 | * | 11/2017 | Issing | B65G 1/0407 |

\* cited by examiner

CYLINDRICAL SORTATION SYSTEMS AND METHODS

BACKGROUND

Sortation of items in facilities, such as material handling facilities, can be inefficient in terms of time, space, cost, and labor. For example, sorting processes may be performed largely manually and with fixed capacity, and such processes may take up a large amount of space within facilities. In addition, slow or inefficient sorting processes may in turn adversely affect downstream processes, such as storage, picking, packing, and shipping items from material handling facilities, because unsorted items may generally be unavailable to such downstream processes. Accordingly, there is a need for sortation systems and methods that can operate with improved efficiency in terms of time, space, cost, and/or labor, with variable and scalable capacity, and with a smaller footprint within facilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
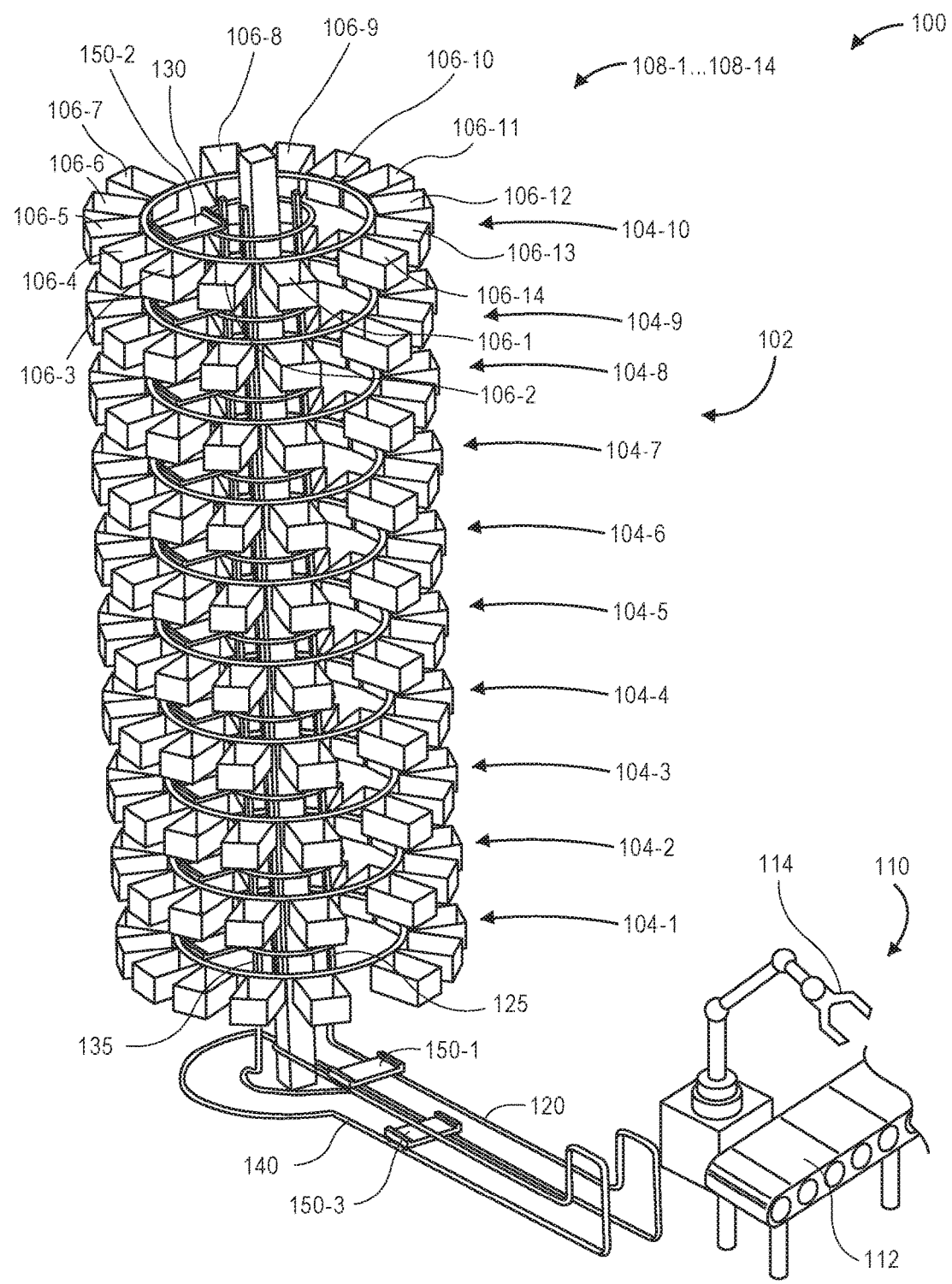
FIG. 1 is a schematic, perspective view diagram of a cylindrical sortation system, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The sortation systems and methods described herein may improve sortation rates and throughput, among other efficiency improvements, while reducing operational costs and occupying a smaller footprint as compared to existing sortation systems. In addition, the sortation systems and methods described herein may provide a higher sortation density than existing sortation systems, and may also provide variable and scalable operations as needed over time.

The sortation systems and methods described herein may include one or more cylindrical sortation towers each having one or more sortation levels. Each of the sortation levels may include a plurality of sortation positions arranged around a periphery of the sortation level. A sortation container, e.g., a bin or tote, may be removably associated with each sortation position.

Each cylindrical sortation tower may also include horizontal sort rails or tracks that lead from upstream processing stations to the cylindrical sortation tower. The horizontal sort rails or tracks may connect to vertical sort rails or tracks that extend vertically through the one or more sortation levels. The vertical sort rails or tracks may connect to circumferential rails or tracks at each of the sortation levels. The circumferential rails or tracks may extend adjacent to each of the plurality of sortation positions of the sortation level, and may also connect to vertical return rails or tracks that extend vertically through the one or more sortation levels. The vertical return rails or tracks may connect to horizontal return rails or tracks that connect to upstream processing stations of the cylindrical sortation tower. One or more shuttles may travel along the horizontal rails or tracks, the vertical rails or tracks, and the circumferential rails or tracks.

Each cylindrical sortation tower may operate downstream of one or more singulation and/or induction stations and processes. Items to be sorted by the sortation systems and methods described herein may be singulated and inducted to one or more shuttles. Each shuttle may carry an item along the horizontal rails or tracks, the vertical rails or tracks, and the circumferential rails or tracks to a desired sort location associated with the item, transfer the item to the sortation container at the desired sort location, and then return to the one or more singulation and/or induction stations and processes via the horizontal rails or tracks, the vertical rails or tracks, and the circumferential rails or tracks to receive a new item for sortation.

After all items intended for a sortation container have been transferred to the sortation container, one or more tote removal and replenishment systems including one or more robotic arms may remove the completed sortation container and transfer it to subsequent processes. In addition, the one or more robotic arms may place a new sortation container at the respective sortation position, thereby facilitating continuous operation of the sortation systems and methods described herein.

Figure 2:
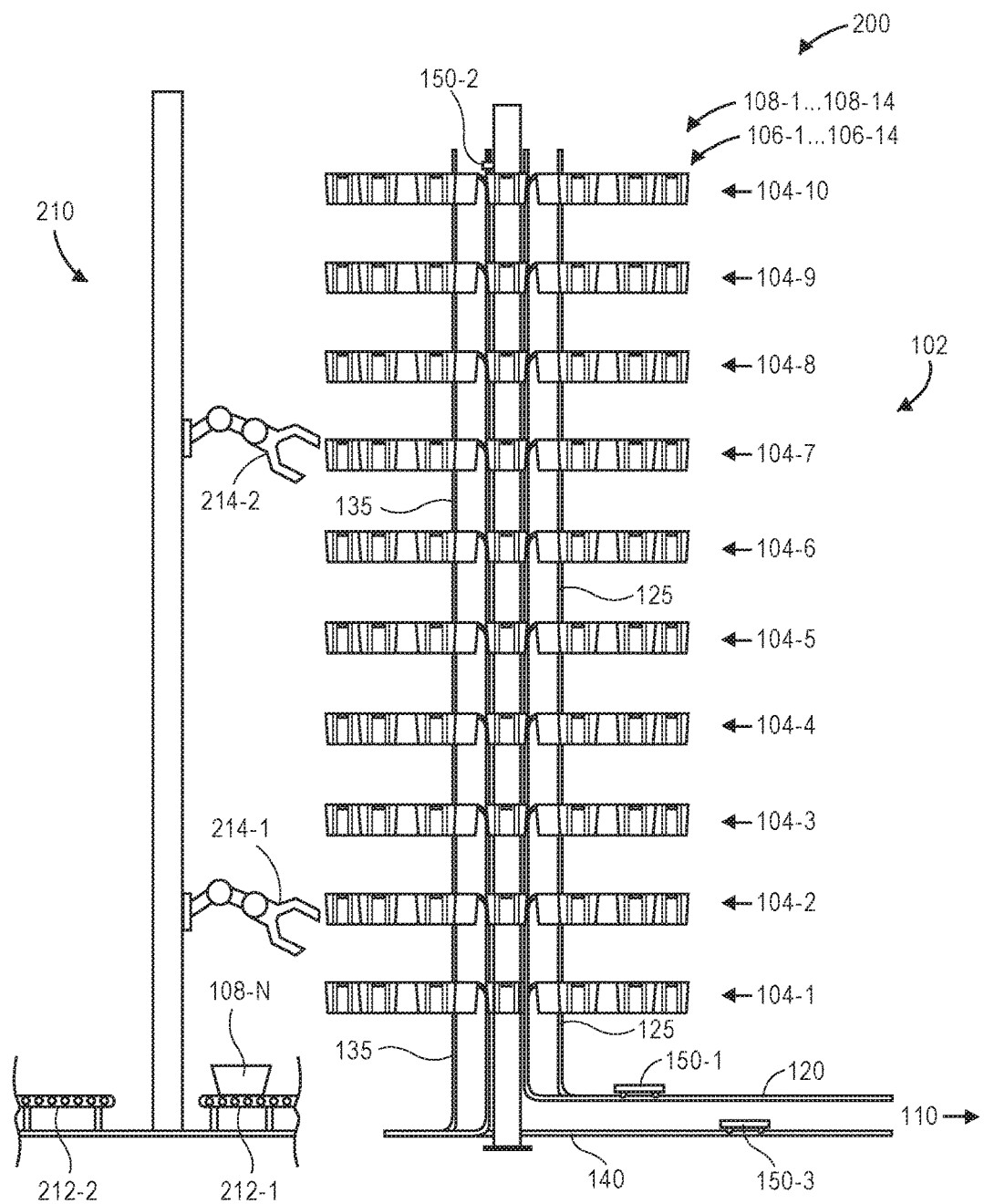
FIG. 2 is a schematic, side view diagram of the cylindrical sortation system, according to an implementation.

FIG. 1 is a schematic, perspective view diagram of a cylindrical sortation system 100, according to an implementation, and FIG. 2 is a schematic, side view diagram of a cylindrical sortation system 200, according to an implementation. The cylindrical sortation systems 100, 200 include common components but illustrate various additional systems and processes that may interact with the common components and that may be combined together in an integrated system.

The cylindrical sortation system 100 may include one or more cylindrical sortation towers 102 having one or more sortation levels 104. One or more central beams may support the cylindrical sortation tower 102, and the central beam may connect to each of the sortation levels 104 with suitable structural supports and reinforcements. As shown in FIGS. 1 and 2, the cylindrical sortation tower 102 includes ten sortation levels 104-1, 104-2, 104-3, 104-4, 104-5, 104-6, 104-7, 104-8, 104-9, 104-10.

Each sortation level 104 may include a plurality of sortation positions 106 arranged around a periphery of the sortation level 104. The sortation positions 106 may extend at least partially around a cylindrical or circular periphery of the sortation level 104. As shown in FIGS. 1 and 2, the sortation level 104-10 includes fourteen sortation positions 106-1, 106-2, 106-3, 106-4, 106-5, 106-6, 106-7, 106-8, 106-9, 106-10, 106-11, 106-12, 106-13, 106-14.

In addition, each of the sortation positions 106 may include an associated sortation container 108. The sortation containers 108 may be removably connected to the sortation positions 106 by any suitable structures. For example, in some embodiments, a protruding portion or edge of the sortation container 108 may slide or clip into a channel or groove at the sortation position 106, or vice versa. In other embodiments, the sortation position 106 may include arms, rods, poles, beams, platforms, or other supports that extend radially outward from a center of the sortation level 104 and that support a base, sides, edges, or other portions of a sortation container 108. As shown in FIGS. 1 and 2, the sortation level 104-10 includes fourteen sortation containers 108-1, 108-2, 108-3, 108-4, 108-5, 108-6, 108-7, 108-8, 108-9, 108-10, 108-11, 108-12, 108-13, 108-14 associated with each of the fourteen sortation positions 106-1, 106-2, 106-3, 106-4, 106-5, 106-6, 106-7, 106-8, 106-9, 106-10, 106-11, 106-12, 106-13, 106-14, respectively. In addition, although FIGS. 1 and 2 show the sortation containers 108 as being substantially rectangular or square, the sortation containers 108 may have any shape, including circular, triangular, other polygonal shapes, or other shapes. For example, each of the sortation containers 108 may have a shape of an annular sector or region, such that the plurality of sortation containers 108 on each sortation level together form a substantially complete annular ring and thereby optimize or maximize the available storage space for items around the circumference of each sortation level.

The cylindrical sortation systems 100, 200 may be fed by various upstream processes, such as one or more singulation and/or induction stations 110. The singulation/induction stations 110 may provide singulated items to the cylindrical sortation systems 100, 200. For example, as shown in FIG. 1, one or more conveyors 112 or other conveyance devices (or human operators) may convey singulated items toward the cylindrical sortation systems 100, 200, and one or more robotic arms 114 or other mechatronic devices (or human operators) may transfer the singulated items to shuttles 150 that sort the items within the cylindrical sortation systems 100, 200.

The cylindrical sortation systems 100, 200 may also include various rails or tracks along which shuttles 150 may travel, which rails or tracks are only schematically shown in FIGS. 1 and 2. For example, horizontal sort rails or tracks 120 may extend from singulation/induction stations 110 to a base of a cylindrical sortation tower 102. The horizontal sort rails or tracks 120 may connect to vertical sort rails or tracks 125 that extend vertically upward through the sortation levels 104 of the cylindrical sortation tower 102. At each sortation level 104, the vertical sort rails or tracks 125 may connect to circumferential rails or tracks 130. The circumferential rails or tracks 130 may extend adjacent each of the plurality of sortation positions 106 and sortation containers 108 on a respective sortation level 104. The circumferential rails or tracks 130 may also connect to vertical return rails or tracks 135 that extend vertically downward through the sortation levels 104 of the cylindrical sortation tower 102. At the base of the cylindrical sortation tower 102, the vertical return rails or tracks 135 may connect to horizontal return rails or tracks 140 that extend to singulation/induction stations 110.

One or more shuttles 150 (e.g., three shuttles 150-1, 150-2, 150-3 as shown in FIGS. 1 and 2), as further described herein, may travel along the various rails or tracks between singulation/induction stations 110 and desired sort locations (e.g., cylindrical sortation towers, sortation levels, sortation positions, and/or sortation containers) for items within the cylindrical sortation systems 100, 200. For example, a shuttle 150 may receive an item from a singulation/induction station 110, e.g., from a robotic arm 114 that transfers the item from a conveyor 112 to an upper surface of the shuttle 150. The shuttle 150 may determine or receive a desired sort location associated with the item. Then, the shuttle 150 may travel along the horizontal sort rails 120 to a desired cylindrical sortation tower 102, and may then travel along the vertical sort rails 125 to a desired sortation level 104. The shuttle 150 may then travel along the circumferential rails 130 to a desired sortation position 106 and sortation container 108, and may transfer the item to the sortation container 108 at the desired sortation position 106. The shuttle 150 may then travel along the vertical return rails 135 to the base of the cylindrical sortation tower 102, and may then travel along the horizontal return rails 140 to the singulation/induction station 110 to receive a new item for sortation.

The cylindrical sortation systems 100, 200 may feed various downstream processes, such as storage, picking, packing, shipping, or other subsequent processes. Once all items intended for a sortation position 106 have been sorted to the respective sortation container 108, a tote removal and replenishment system 210 may remove the completed sortation container 108 and replenish the sortation position 106 with a new, empty sortation container 108-N. For example, as shown in FIG. 2, one or more robotic arms 214 or other mechatronic devices may grasp and remove a completed sortation container 108 from a respective sortation position 106, and place the completed sortation container 108 on one or more conveyors 212 or other conveyance devices to convey it to subsequent processes. In addition, one or more robotic arms 214 or other mechatronic devices may grasp a new, empty sortation container 108-N from one or more conveyors 212 or other conveyance devices, and place the new, empty sortation container 108-N at the respective sortation position 106. The robotic arms 214 may travel along a support beam or other support structure in order to access at least a portion of the sortation positions 106 and sortation containers 108 of one or more cylindrical sortation towers 102.

In addition, various components of the cylindrical sortation systems 100, 200 may be connected to and communicate with a sortation system controller 1000, as further described herein. For example, the singulation/inductions stations 110, e.g., conveyors 112 and robotic arms 114, the shuttles 150, movable/actuatable portions of the rails or tracks, as further described herein, and/or the tote removal and replenishment systems 210, e.g., conveyors 212 and robotic arms 214, may each be connected to and communicate with the sortation system controller 1000. The sortation system controller 1000 may receive and/or store data from the various components, and may instruct operations for any of the components of the systems 100, 200. For example, the received and/or stored data may include data related to sorted items, items to be sorted, sort locations, cylindrical sortation towers, sortation levels, sortation positions, sortation containers, shuttles, rails or tracks, conveyors, and/or robotic arms, and the instructions may relate to operations of the shuttles, movable/actuatable portions of the rails or tracks, conveyors, and/or robotic arms.

In addition, various types of identifiers may be associated with various components or portions of components of the systems 100, 200. The identifiers may include alphanumeric identifiers, barcodes, symbols, radiofrequency identifiers (e.g., radiofrequency identification tags), or other identifiers. For example, unique identifiers may be associated with each singulation/induction station, each cylindrical sortation tower, each sortation level, each sortation position, each sortation container, each shuttle, and/or each item. In addition, unique identifiers may be associated with portions of any of the rails or tracks described herein. Alternatively, some identifiers may not be unique with respect to every other identifier. For example, every first sortation level of a plurality of cylindrical sortation towers may have the same identifier, and an identifier associated with each of the cylindrical sortation towers may be used to identify a particular first sortation level. Likewise, every first sortation position of a plurality of sortation levels may have the same identifier, and an identifier associated with each of the sortation levels and/or the cylindrical sortation towers may be used to identify a particular first sortation position.

By the use of such identifiers within the systems 100, 200, a shuttle 150 may navigate to a desired singulation/induction station to receive an item, and may navigate to a desired sort location by detecting identifiers associated with an item, a desired cylindrical sortation tower, a desired sortation level, a desired sortation position, a desired sortation container, and/or various portions of the rails or tracks upon which the shuttle may travel in order to reach a desired sort location. Alternatively or in addition, sensors associated with the sortation system may detect identifiers of shuttles 150 as they travel through the sortation system, and may instruct or guide the shuttles 150 to desired sort locations based on their detected locations. In addition, a robotic arm 114, 214 may transfer sortation containers within the systems 100, 200 by detecting identifiers associated with an item, a shuttle, a cylindrical sortation tower, a sortation level, a sortation position, and/or a sortation container. The sortation system, shuttles, and robotic arms may detect the identifiers using various sensing devices, such as imaging devices or sensors, scanning devices, radiofrequency identification readers, or other sensing devices.

At various times during the sortation processes, two or more identifiers may be associated with or disassociated from each other, and such associations and disassociations may be stored in a memory of a control system, as further described herein. For example, upon singulation and/or induction of an item to a shuttle, an identifier of the item may be associated with an identifier of the shuttle. The identifier of the item may also be associated with a desired sort location. Upon sortation of the item to a sortation container at the desired sort location, the identifier of the item may be disassociated from the identifier of shuttle, and the identifier of the item may be associated with the identifier of the sortation container. Further, upon placement of a sortation container at a sortation position, an identifier of the sortation container may be associated with identifiers of the sortation tower, the sortation level, and/or the sortation position. Upon sortation of one or more items to the sortation container, the identifier of the sortation container may be associated with identifiers of each of the one or more items. Upon removal of the sortation container from the sortation position, the identifier of the sortation container may be disassociated from identifiers of the sortation tower, the sortation level, and/or the sortation position. Various other associations between two or more identifiers within the system may be stored, including relatively transient associations between shuttles and their locations on portions of the rails or tracks during operation, or others.

Although FIGS. 1 and 2 show the cylindrical sortation tower 102 including a particular number and configuration of sortation levels 104, sortation positions 106, sortation containers 108, horizontal tracks 120, 140, vertical tracks 125, 135, circumferential tracks 130, and shuttles 150, any other number or configuration of sortation levels 104, sortation positions 106, sortation containers 108, horizontal tracks 120, 140, vertical tracks 125, 135, circumferential tracks 130, and shuttles 150 may be included in the cylindrical sortation tower 102. In addition, various sortation levels 104 of a cylindrical sortation tower 102 may have different numbers of sortation positions 106 and sortation containers 108. Further, although FIGS. 1 and 2 show the sortation systems 100, 200 including cylindrical sortation towers 102, the sortation towers 102 may also comprise other shapes, such as elliptical, oval, triangular or other polygonal shapes, or other shapes.

Additionally, although only a single cylindrical sortation tower 102, a single singulation/induction station 110, corresponding tracks, and a single tote removal and replenishment system 210 are shown as part of the cylindrical sortation systems 100, 200, any other number or configuration of one or more cylindrical sortation towers 102, one or more singulation/induction stations 110, corresponding tracks, and/or one or more tote removal and replenishment systems 210 may operate together within the systems. Moreover, although the singulation/induction station 110 is shown as including one conveyor 112 and one robotic arm 114, and the tote removal and replenishment system 210 is shown as including two conveyors 212-1, 212-2 and two robotic arms 214-1, 214-2, any other number or configuration of one or more conveyors 112, 212 and one or more robotic arms 114, 214 may be included within the systems.

Furthermore, the sortation systems 100, 200 may extend vertically through two or more floors of a facility. For example, a lowest sortation level 104 of a sortation tower 102 may be at or just above the floor level of a first floor of a facility, and an uppermost sortation level 104 of the sortation tower 102 may be at or just below the floor level of a second floor of the facility. In this example, the sortation tower 102 may be accessed from each of the first and second floors of the facility. In addition, each of the first and second floors may include one or more singulation/induction stations and/or one or more tote removal and replenishment systems that operate in coordination with the sortation tower 102. For example, shuttles routed from a singulation/induction station on the first floor may travel vertically up the sortation tower via vertical sort tracks (along which the primary direction of travel is upward), whereas shuttles routed from a singulation/induction station on the second floor may travel vertically down the sortation tower via vertical return tracks (along which the primary direction of travel is downward). After successfully transferring items to sortation containers, the shuttles may not return to a singulation/induction station on the floor from which they originated but may instead continue to travel in the same direction along the same vertical tracks to a singulation/induction station on the other floor.

The cylindrical sortation systems 100, 200 described herein may provide improved sortation rates and throughput, at least in part due to the autonomous or semi-autonomous sorting of items using shuttles within the systems. In addition, the autonomous or semi-autonomous upstream processes, e.g., singulation and/or induction, and downstream processes, e.g., tote removal and replenishment processes, may further facilitate the improved sortation rates and throughput. Further, the cylindrical configuration of the sortation systems 100, 200 described herein may provide increased storage density within a smaller footprint as compared to existing systems, and may utilize overhead space within facilities that may generally be underutilized or completely unutilized.

Moreover, the operations of the cylindrical sortation systems 100, 200 may be variable and scalable by varying the number of sortation towers, the number of sortation levels, the number of sortation positions or sortation containers, and/or the number of shuttles, as well as the number of conveyors and/or robotic arms used in upstream or downstream processes. For example, to increase sortation capacity, additional cylindrical sortation towers may be added or used, additional sortation levels may be added or used, additional sortation positions may be added or used, additional sortation containers may be added or used, additional shuttles may be added or used, and/or additional conveyors and/or robotic arms may be added or used. In contrast, to decrease sortation capacity, one or more cylindrical sortation towers may be removed or unused, one or more sortation levels may be removed or unused, one or more sortation positions may be removed or unused, one or more sortation containers may be removed or unused, one or more shuttles may be removed or unused, and/or one or more conveyors and/or robotic arms may be removed or unused.

Figure 3:
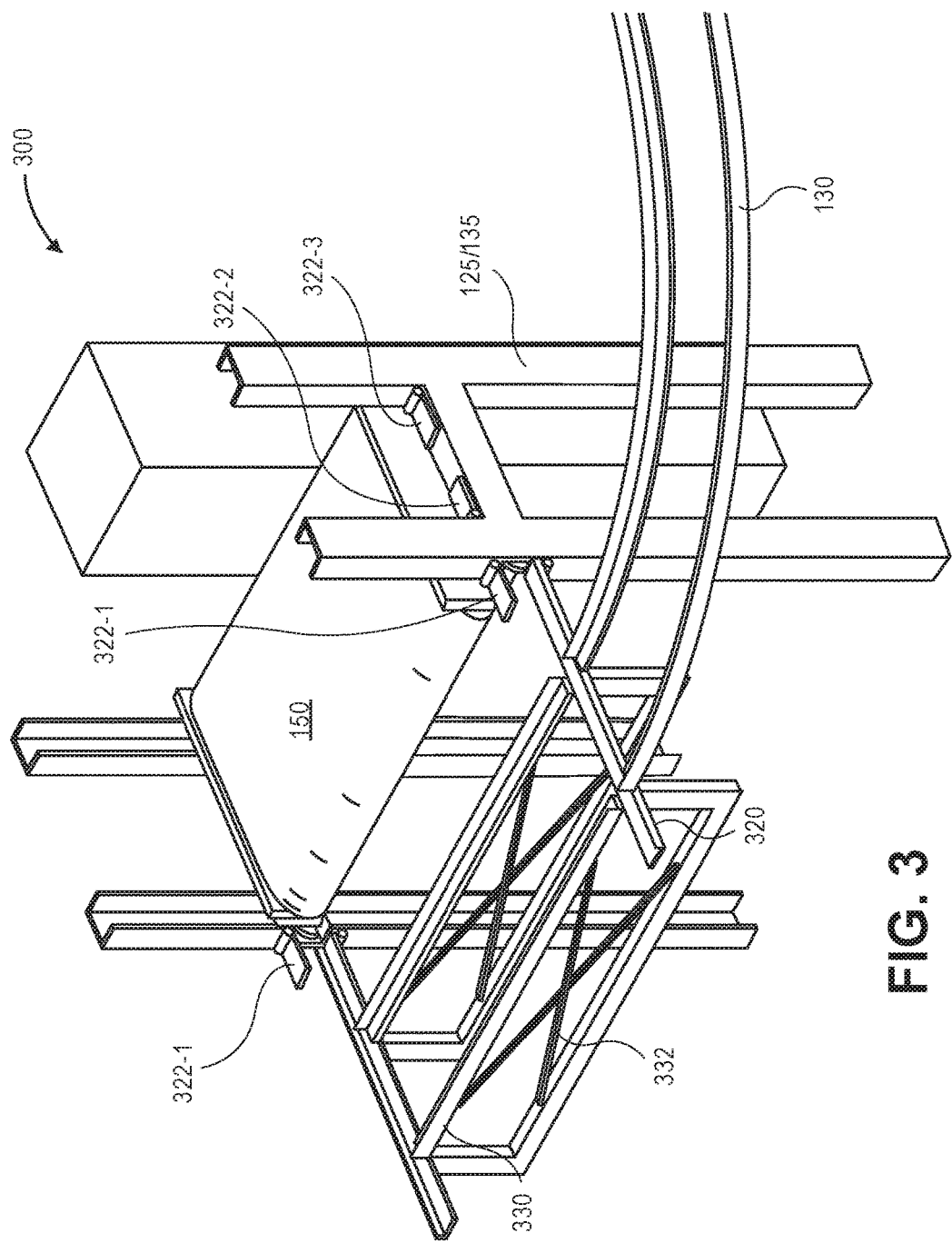
FIG. 3 is a schematic, partial, top perspective view diagram of a sortation level of the cylindrical sortation system, according to an implementation.
Figure 4:
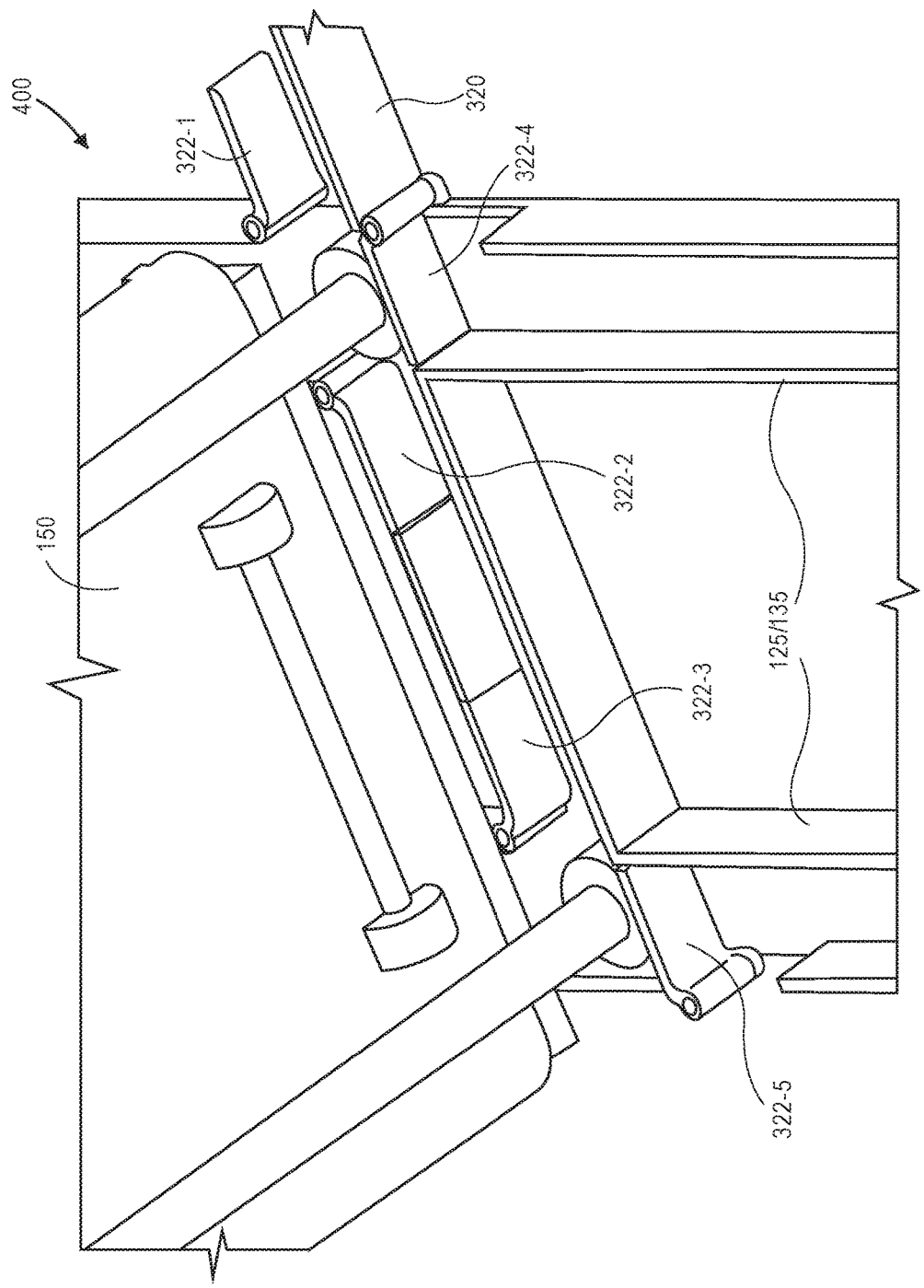
FIG. 4 is a schematic, partial, bottom perspective view diagram of the sortation level of the cylindrical sortation system, according to an implementation.

FIG. 3 is a schematic, partial, top perspective view diagram of a sortation level 300 of the cylindrical sortation system, according to an implementation, and FIG. 4 is a schematic, partial, bottom perspective view diagram of a sortation level 400 of the cylindrical sortation system, according to an implementation. For example, the sortation levels 300, 400 may be examples of any of the sortation levels 104 shown in FIGS. 1 and 2.

As shown in FIG. 3, a shuttle 150 has traveled along vertical tracks 125, 135 to the sortation level 300, e.g., a desired sortation level. For example, the vertical tracks 125, 135 may be formed as C-shaped channels and include racks having gear teeth that engage with corresponding gear teeth on a first set of wheels of the shuttle 150, as further described herein, such that the shuttle 150 can selectively and controllably move vertically within the vertical tracks 125, 135 to any desired sortation level.

In order for the shuttle 150 to move from the vertical tracks 125, 135 to the circumferential tracks 130 on the sortation levels 300, 400, one or more latch mechanisms 322 on the vertical tracks 125, 135 may open, rotate, or move to support the shuttle 150 and allow it to exit the vertical tracks 125, 135. In some embodiments, the latch mechanisms 322 may comprise portions of the vertical tracks 125, 135 that are hinged or otherwise movable or rotatable, and associated actuators, e.g., servos, solenoids, motors, linear actuators, rotary actuators, or other actuators.

FIGS. 3 and 4 show five latch mechanisms 322-1, 322-2, 322-3, 322-4, 322-5 that may operate in coordination to allow the shuttle 150 to exit the vertical tracks 125, 135. For example, when the shuttle 150 is situated above latch mechanisms 322-4, 322-5, the latch mechanisms 322-4, 322-5 may actuate to provide horizontal support surfaces for the first set of wheels of the shuttle 150. Each of the latch mechanisms 322-4, 322-5 may rotate into the vertical tracks 125, 135 approximately 90 degrees. Then, when the first set of wheels of the shuttle 150 are supported by the horizontal support surfaces of the latch mechanisms 322-4, 322-5, the latch mechanisms 322-1, 322-2, 322-3 may actuate to allow the shuttle 150 to exit the vertical tracks 125, 135. Each of the latch mechanisms 322-1, 322-2, 322-3 may rotate away from the vertical tracks 125, 135 approximately 90 degrees or more.

As shown in FIGS. 3 and 4, the sortation levels 300, 400 may also include connecting tracks 320 that extend from the vertical tracks 125, 135 toward the circumferential tracks 130. The connecting tracks 320 may be formed as L-shaped channels facing each other, such that the first set of wheels of the shuttle 150 are supported on top of and between the L-shaped channels of the connecting tracks 320. Ends of the connecting tracks 320 distal from the vertical tracks 125, 135 may include stops or other structures to limit the travel of shuttles 150 along the connecting tracks 320.

As the shuttle 150 travels along the connecting tracks 320, the shuttle 150 may pass over movable or actuatable sections 330 of the circumferential tracks 130. The movable sections 330 may comprise scissor lift-type mechanisms 332 and associated actuators, e.g., servos, solenoids, motors, linear actuators, rotary actuators, or other actuators, as schematically shown in FIG. 3, such that the movable sections 330 may move vertically relative to the connecting tracks 320 and a remainder of the circumferential tracks 130. Alternatively or in addition, other mechanisms, such as servos, solenoids, linear actuators, or screw actuators, may be used to actuate the movable sections 330 vertically.

When the shuttle 150 has traveled along the connecting tracks 320 to a location over the movable sections 330, the movable sections 330 may move vertically to lift the shuttle 150 via contact with a second set of wheels, as further described herein. The movable sections 330 and the circumferential tracks 130 may be formed as L-shaped channels facing each other, such that the second set of wheels of the shuttle 150 are supported on top of and between the L-shaped channels of the movable sections 330 and the circumferential tracks 130. The movable sections 330 may rise vertically such that upper surfaces of the movable sections 330 are substantially horizontally aligned with upper surfaces of a remainder of the circumferential tracks 130. The second set of wheels and/or the gaps or spacing between the movable sections 330 and the circumferential tracks 130 may be configured such that the second set of wheels may travel over the gaps between the movable sections 330 and the circumferential tracks 130. Then, the shuttle 150 may travel along the movable sections 330 and circumferential tracks 130 to a desired sortation position and sortation container. Although FIG. 3 shows circumferential tracks 130 extending in only one direction from the movable sections 330, the circumferential tracks 130 may extend in two opposite directions from the movable sections 330 and form a substantially circular or cylindrical path around the sortation level 300, 400.

After transferring an item to a desired sortation container, the shuttle 150 may continue to travel along the circumferential tracks 130 and stop at a location over the movable sections 330. Then, the process described herein may be substantially reversed so that the shuttle 150 may leave the movable sections 330 and circumferential tracks 130 and enter the vertical tracks 125, 135 via the connecting tracks 320. For example, the movable sections 330 may lower the shuttle 150 such that the second set of wheels are no longer in contact with the movable sections 330 and the first set of wheels are in contact with the connecting tracks 320. Then, the shuttle 150 may travel along the connecting tracks 320 toward the vertical tracks 125, 135. The latch mechanisms 322-1, 322-2, 322-3, 322-4, 322-5 may be actuated to allow the shuttle 150 to enter the vertical tracks 125, 135 with the first set of wheels on the horizontal support surfaces of the latch mechanisms 322-4, 322-5. After the shuttle 150 has entered the vertical tracks 125, 135, the latch mechanisms 322-1, 322-2, 322-3 may actuate to retain the shuttle 150 within the vertical tracks 125, 135, and gear teeth on the first set of wheels of the shuttle 150 may engage with corresponding gear teeth on racks within the vertical tracks 125, 135. Then, the latch mechanisms 322-4, 322-5 may actuate to allow the shuttle 150 to freely move vertically within the vertical tracks 125, 135.

Although FIGS. 3 and 4 show only a single instance of vertical tracks 125, 135, latch mechanisms 322, connecting tracks 320, and movable sections 330 that allow a shuttle 150 to travel between vertical tracks 125, 135 and circumferential tracks 130, any number of such instances may be included at each sortation level of a cylindrical sortation tower. For example, each sortation level may include two such instances, with one instance being associated with vertical sort tracks 125 along which shuttles 150 may generally travel vertically upward with items to be sorted, and with another instance being associated with vertical return tracks 135 along which shuttles 150 may generally travel vertically downward to return to singulation/induction stations and receive additional items for sortation.

Further, the transitions between any of the horizontal tracks 120, 140 and any of the vertical tracks 125, 135, e.g., at a base of a cylindrical sortation tower, as well as any other transitions between horizontal and vertical portions of the tracks described herein, e.g., portions of the tracks near singulation/induction stations 110, may also include latch mechanisms 322 that operate substantially as described herein with respect to FIGS. 3 and 4. For example, latch mechanisms similar to latch mechanisms 322-1, 322-2, 322-3 may be incorporated in other portions of tracks to facilitate transitions of shuttles 150 between horizontal and vertical portions. In addition, latch mechanisms similar to latch mechanisms 322-4, 322-5 may be incorporated in other portions of tracks to facilitate transitions of shuttles 150 between horizontal and vertical portions by supporting the shuttles 150 at particular portions of the tracks.

In addition, although vertical portions of the tracks described herein may be formed as C-shaped channels having racks with gear teeth that engage with corresponding gear teeth on first sets of wheels of shuttles 150, horizontal portions of the tracks described herein may be formed as L-shaped channels, with or without racks having gear teeth, such that the shuttles 150 may traverse such horizontal portions of the tracks using first or second sets of wheels, with or without corresponding gear teeth on such wheels.

In alternative embodiments to those shown and described herein with respect to FIGS. 1-4 for example, the cylindrical sortation tower may include horizontal tracks that lead from a singulation/induction station to the base of the tower, circumferential tracks that extend around a periphery at or near the base of the tower, and a plurality of vertical tracks that extend vertically to one or more sortation levels of the tower, in which each vertical track extends adjacent a sortation position at a same radial or sortation position of each of the one or more sortation levels. In such alternative embodiments, a shuttle may carry an item for sortation from the singulation/induction station to the base of the tower via the horizontal tracks, move to the circumferential tracks at or near the base of the tower, travel to a desired sortation position via the circumferential tracks, then transition to the vertical tracks at the desired sortation position, move vertically to a desired sortation level via the vertical tracks, and transfer the item to the sortation container at the desired sortation level.

In addition, in such alternative embodiments, after transferring the item to the sortation container at the desired sortation level, the shuttle may return vertically downward to the circumferential tracks at or near the base of the tower via the same vertical tracks, move to the horizontal tracks at the base of the tower via the circumferential tracks, and then travel back to the singulation/induction station to receive a new item for sortation via the horizontal tracks.

In further alternative embodiments, the cylindrical sortation tower may include circumferential tracks at an upper end thereof (and/or at one or more intermediate vertical locations of the cylindrical sortation tower), and vertical return tracks that extend vertically through the one or more sortation levels down to the circumferential tracks at or near the base of the tower and/or to one or more horizontal tracks at the base of the tower. The vertical return tracks may extend vertically substantially through a center of the one or more sortation levels, or one or more of the vertical return tracks at one or more radial positions around the periphery of the sortation tower may be designated as vertical return tracks. In such further alternative embodiments, after transferring the item to the sortation container at the desired sortation level, the shuttle may continue vertically upward to the circumferential tracks at the upper end (and/or at one or more intermediate vertical locations) of the tower, move to the circumferential tracks, transition to the vertical return tracks via the circumferential tracks, then return vertically downward to the circumferential tracks at or near the base of the tower and/or to the one or more horizontal tracks at the base of the tower, and then travel back to the singulation/induction station to receive a new item for sortation via the horizontal tracks. Moreover, features of any of the alternative embodiments may be combined with each other and/or with features of any of the various embodiments described herein.

Figure 5A:
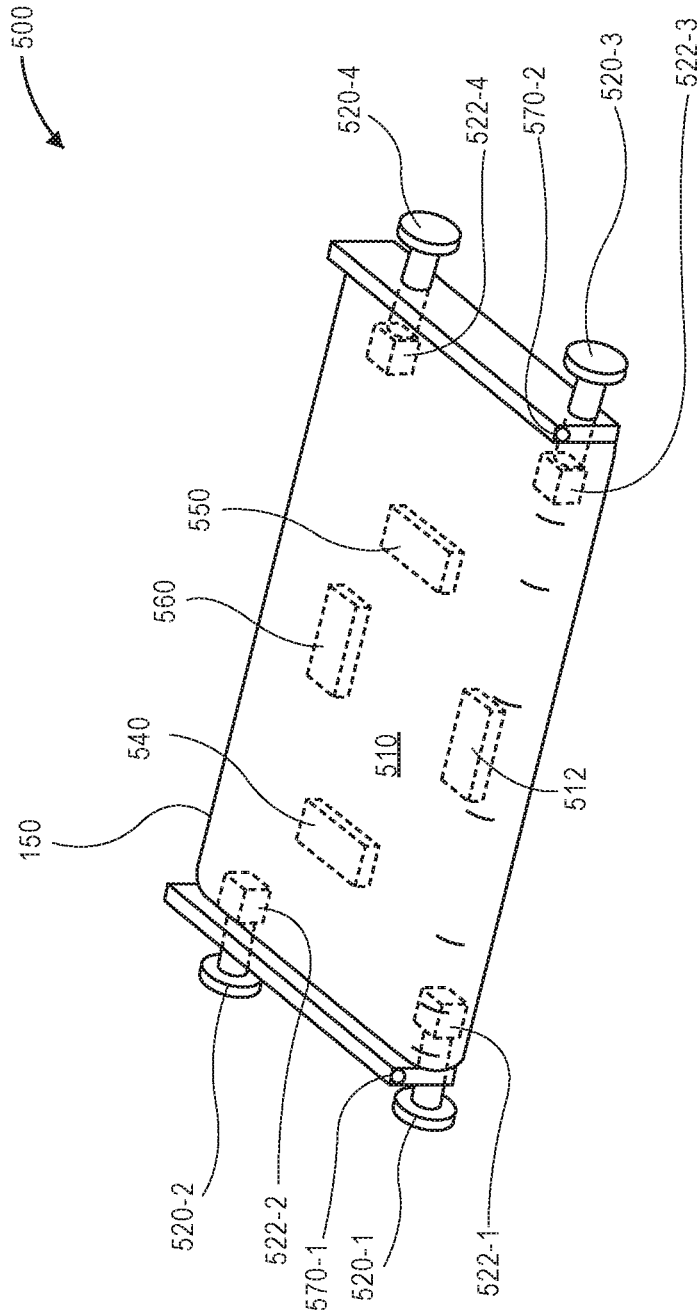
FIG. 5A is a schematic, top perspective view diagram of a shuttle of the cylindrical sortation system, according to an implementation.
Figure 5B:
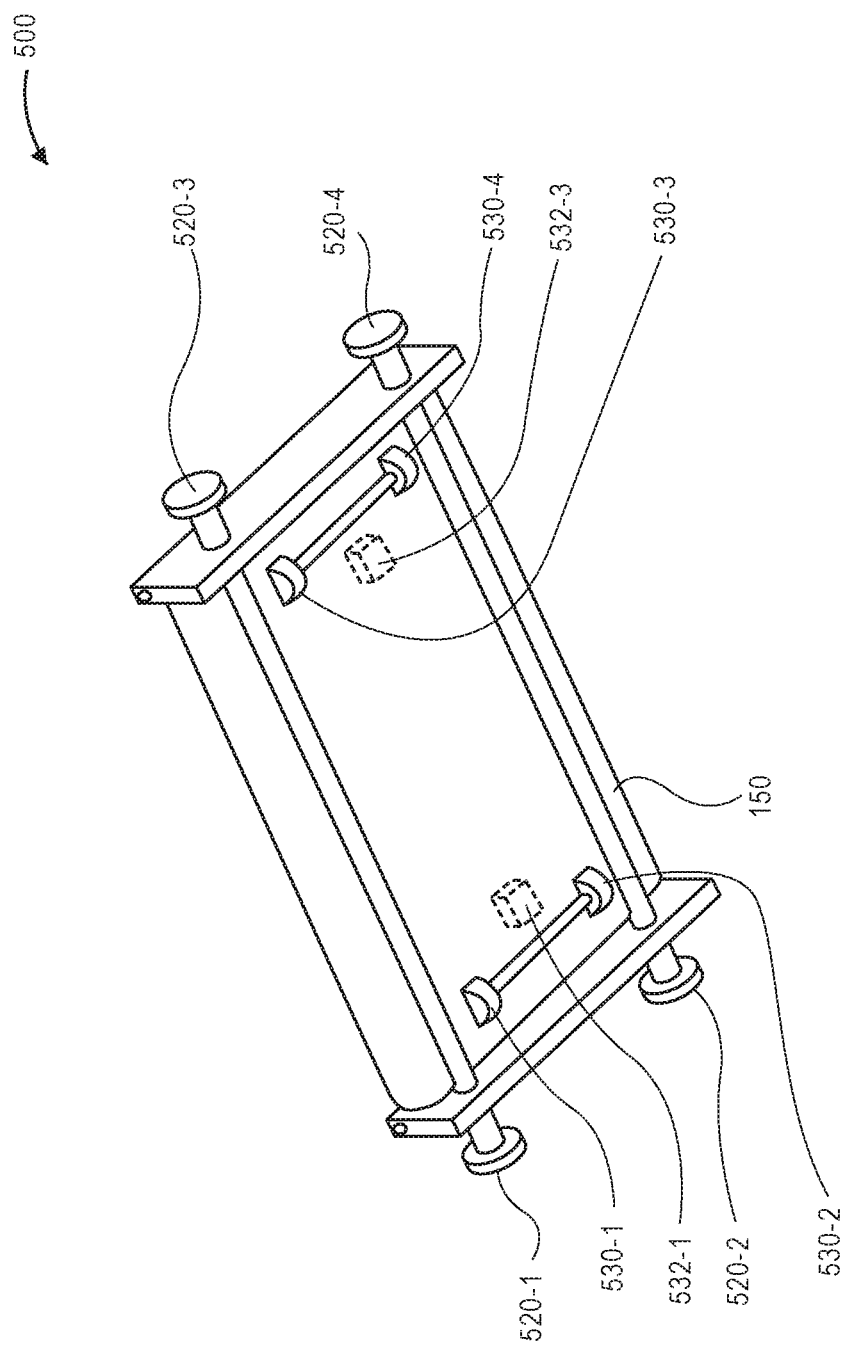
FIG. 5B is a schematic, bottom perspective view diagram of the shuttle of the cylindrical sortation system, according to an implementation.

FIG. 5A is a schematic, top perspective view diagram of a shuttle 500 of the cylindrical sortation system, according to an implementation, and FIG. 5B is a schematic, bottom perspective view diagram of the shuttle 500 of the cylindrical sortation system, according to an implementation. For example, the shuttle 500 may be an example of any of the shuttles 150 shown in FIGS. 1-4.

The shuttle 500 may include an upper surface 510 that receives an item for sortation, and that can transfer the item to a sortation container at a sortation position. For example, the upper surface 510 may comprise a conveyor belt, e.g., a cross-belt sorter, operatively connected to an associated actuator 512. The actuator 512 may be a motor or other rotary actuator that can actuate the conveyor belt on the upper surface 510. Alternatively or in addition, the upper surface 510 may comprise one or more rollers, e.g., cylindrical or spherical rollers, operatively connected to an associated actuator 512. The actuator 512 may be a motor or other rotary actuator that can actuate the one or more rollers on the upper surface 510. As a further alternative, the upper surface 510 may comprise a tilting surface in which one side of the surface may be raised relative to an opposite side, operatively connected to an associated actuator 512. The actuator 512 may be a solenoid, linear actuator, rotary actuator, screw actuator or other actuator that can actuate the tilting surface on the upper surface 510.

The shuttle 500 may also include a first set of wheels 520 and associated actuators 522. As shown in FIG. 5A, the first set of wheels 520 includes four wheels 520-1, 520-2, 520-3, 520-4 and four actuators 522-1, 522-2, 522-3, 522-4. However, any other number or configuration of the first set of wheels 520 and associated actuators 522 may be used with corresponding rails or tracks. The actuators 522 may be motors or other rotary actuators to rotate the first set of wheels 520. The first set of wheels 520 may comprise gear teeth on at least a portion of their rolling surfaces. The first set of wheels 520 may allow the shuttle 500 to traverse the horizontal sort rails and tracks, the horizontal return rails and tracks, and the connecting tracks. In addition, the gear teeth on the first set of wheels 520 may allow the shuttle 500 to traverse the vertical sort rails and tracks and the vertical return rails and tracks via engagement with racks having corresponding gear teeth within portions of the vertical tracks.

The shuttle 500 may also include a second set of wheels 530 and associated actuators 532. As shown in FIG. 5B, the second set of wheels 530 includes four wheels 530-1, 530-2, 530-3, 530-4 and two actuators 532-1, 532-3. However, any other number or configuration of the second set of wheels 530 and associated actuators 532 may be used with corresponding rails or tracks. The actuators 532 may be motors or other rotary actuators to rotate the second set of wheels 530. The second set of wheels 530 may have axes of rotation that are rotated approximately 90 degrees from axes of rotation of the first set of wheels 520. The second set of wheels 530 may allow the shuttle 500 to traverse the circumferential rails and tracks. In some embodiments, the second set of wheels 530 may comprise spherical rollers to allow the shuttle 500 to traverse the arcuate, e.g., substantially circular, path of the circumferential rails. Further, only a subset of the second set of wheels 530 may be actuated by the actuators 532. In addition, although FIGS. 4 and 5B show the second set of wheels 530 as being recessed into a lower surface of the shuttle 500, the second set of wheels 530 may not be recessed and may be configured at various positions relative to the first set of wheels 520 and/or various other components of the shuttle. For example, the second set of wheels 530 may be located on a horizontal plane that is substantially coplanar with a horizontal plane on which the first set of wheels 520 is located. Alternatively, the second set of wheels 530 may be located on a horizontal plane that is offset, e.g., vertically higher or lower, from a horizontal plane on which the first set of wheels 520 is located. Moreover, the various tracks described herein may be configured and located relative to each other to enable travel of the shuttles according to the particular configurations and locations of the first and second sets of wheels.

Referring again to FIG. 5A, the shuttle 500 may also include a power supply or battery 540, a controller 550, a communication device 560, and one or more sensors 570. Although FIG. 5A shows a particular number and configuration of the power supply 540, the controller 550, the communication device 560, and the sensors 570, any other number or configuration of these components of the shuttle 500 is possible. The power supply or battery 540 may provide power for the various actuators 512, 522, 532 and sensors 570, as well as the controller 550 and the communication device 560. The communication device 560 may allow the shuttle 500 to communicate with other shuttles 500, a sortation system controller 1000, conveyors 112, 212, robotic arms 114, 214, and/or other computing devices or systems to sort items, as described herein, as well as to send and receive information related to the items, shuttles, sort locations, and/or sortation containers.

The one or more sensors 570 may include various sensors to sense items, singulation/induction stations, rails or tracks, and/or sort locations (e.g., cylindrical sortation towers, sortation levels, sortation positions, and sortation containers), in which the various sensors may be placed at multiple locations around the shuttle 500. For example, the sensors 570 may include imaging devices or sensors, scanning devices, radiofrequency identification readers, weight sensors, pressure sensors, or other sensors. During operation, a shuttle 500 may sense its position on the tracks and/or at various locations within the sortation system, using one or more of the sensors 570 such as imaging devices or sensors, scanning devices, radiofrequency identification readers, or other sensors. In addition, the shuttle 500 may sense an item that it is carrying, as well as successful or unsuccessful transfer of the item to a sortation container, using one or more of the sensors 570 such as imaging devices or sensors, scanning devices, radiofrequency identification readers, weight sensors, pressure sensors, or other sensors.

The controller 550, as further described herein, may coordinate the operations of various components of the shuttle 500 in order to travel along the various tracks described herein between singulation/induction stations and desired sort locations of the sortation systems. For example, the controller 550 may identify an item it is carrying using one or more sensors and may communicate with a sortation system controller to determine a desired sort location associated with the item. The controller 550 may actuate the first set of wheels 520 such that the shuttle 500 may travel on horizontal or vertical tracks toward the desired sort location, with input from one or more sensors. The controller 550 may also actuate the second set of wheels 530 such that the shuttle 500 may travel on circumferential tracks toward the desired sort location, with input from one or more sensors. Then, the controller 500 may actuate the actuator 512 associated with the upper surface 510 to transfer the item to a sortation container. The controller 500 may confirm successful transfer of the item using one or more sensors. Then, the controller 500 may actuate the second set of wheels 530 and the first set of wheels 520 such that the shuttle 500 may travel on the circumferential tracks and the vertical or horizontal tracks, respectively, and return to a singulation/induction station to receive another item for sortation, with input from one or more sensors.

Although FIGS. 5A and 5B show a particular shape and configuration of the shuttle 500, any other shape or configuration may be used that allows the shuttle to transport and transfer an item to a desired sort location within the sortation systems described herein. For example, the shuttle 500 may be square, circular, or other shapes. In addition, the upper surface 510 of the shuttle 500 may include additional edges, borders, or other structural features to retain an item during transport. Other variations are also possible, such as different numbers or positions of any of the first or second set of wheels.

Figure 6:
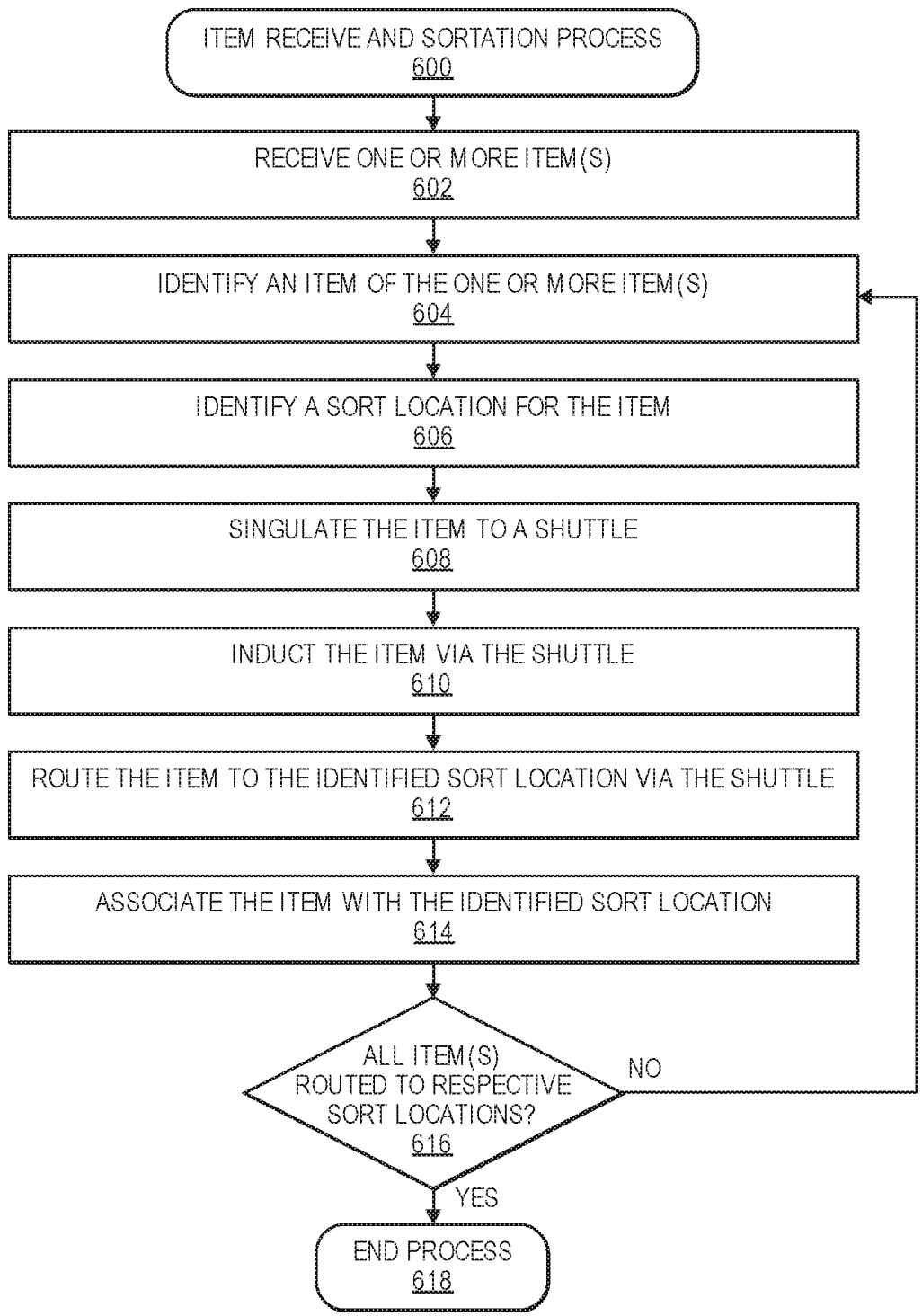
FIG. 6 is a flow diagram illustrating an example item receive and sortation process, according to an implementation.

FIG. 6 is a flow diagram illustrating an example item receive and sortation process 600, according to an implementation. The process 600 may begin by receiving one or more items, as in 602. For example, the one or more items may be received in pallets, cases, or other groups or quantities at a receive area of a material handling facility. The process 600 may proceed by identifying an item of the one or more items, as in 604. For example, as part of the processing at the receive area of the material handling facility, an item may be identified either manually or by automated processes, such as scanning tunnels or systems that may utilize imaging sensors or devices, scanning devices, and/or radiofrequency identification readers.

The process 600 may continue by determining a desired sort location for the identified item, as in 606. The desired sort location may have previously been determined and stored in a memory of a control system, such as a sortation system controller described herein, or the desired sort location may be determined upon identification of the item. For example, the desired sort location may be determined based on characteristics of the item, e.g., weight, size, volume, fragility, item type, item velocity, item priority, item destination, or other characteristics. In addition, the desired sort location may be determined based on characteristics of the sortation system, e.g., capacity, availability, throughput, previously sorted items, additional items to be sorted, weight distribution, or other characteristics. Further, the desired sort location may be associated with identifiers of one or more of a cylindrical sortation tower, a sortation level, a sortation position, and/or a sortation container, and an identifier of the item may be associated with identifiers of the desired sort location.

The process 600 may then continue by singulating the item to a shuttle, as in 608. For example, a conveyor and/or robotic arm (or a human operator) may separate the item from other items to be sorted and place the item on a shuttle to be transported and transferred to the desired sort location via the shuttle. In addition, an identifier of the item may be associated with an identifier of the shuttle. Then, the process 600 may proceed by inducting the item to the sortation system via the shuttle, as in 610, and routing the item to the desired sort location via the shuttle, as in 612. For example, as described herein, the shuttle may transport the item via horizontal tracks, vertical tracks, connecting tracks, movable sections, and/or circumferential tracks to the desired sort location, and may transfer the item to a sortation container at the desired sort location, as further described herein with respect to FIG. 8. The process 600 may continue by associating the item with the desired sort location, as in 614. For example, an identifier of the item may be associated with an identifier of the sortation container, and the identifier of the item may be disassociated from the identifier of the shuttle. In addition, upon successful transfer, the shuttle may return to a singulation/induction station to receive an additional item for sortation.

The process 600 may continue by determining whether all items have been routed to their respective desired sort locations, as in 616. If there are items remaining to be sorted, the process 600 returns to 604 to identify a next item for sortation, and the remaining steps of the process 600 may repeat as described herein. If all items have been routed to their respective desired sort locations, then the process may end, as in 618. The process 600 may restart when further items are received for sortation at the receive area of the material handling facility.

Figure 7:
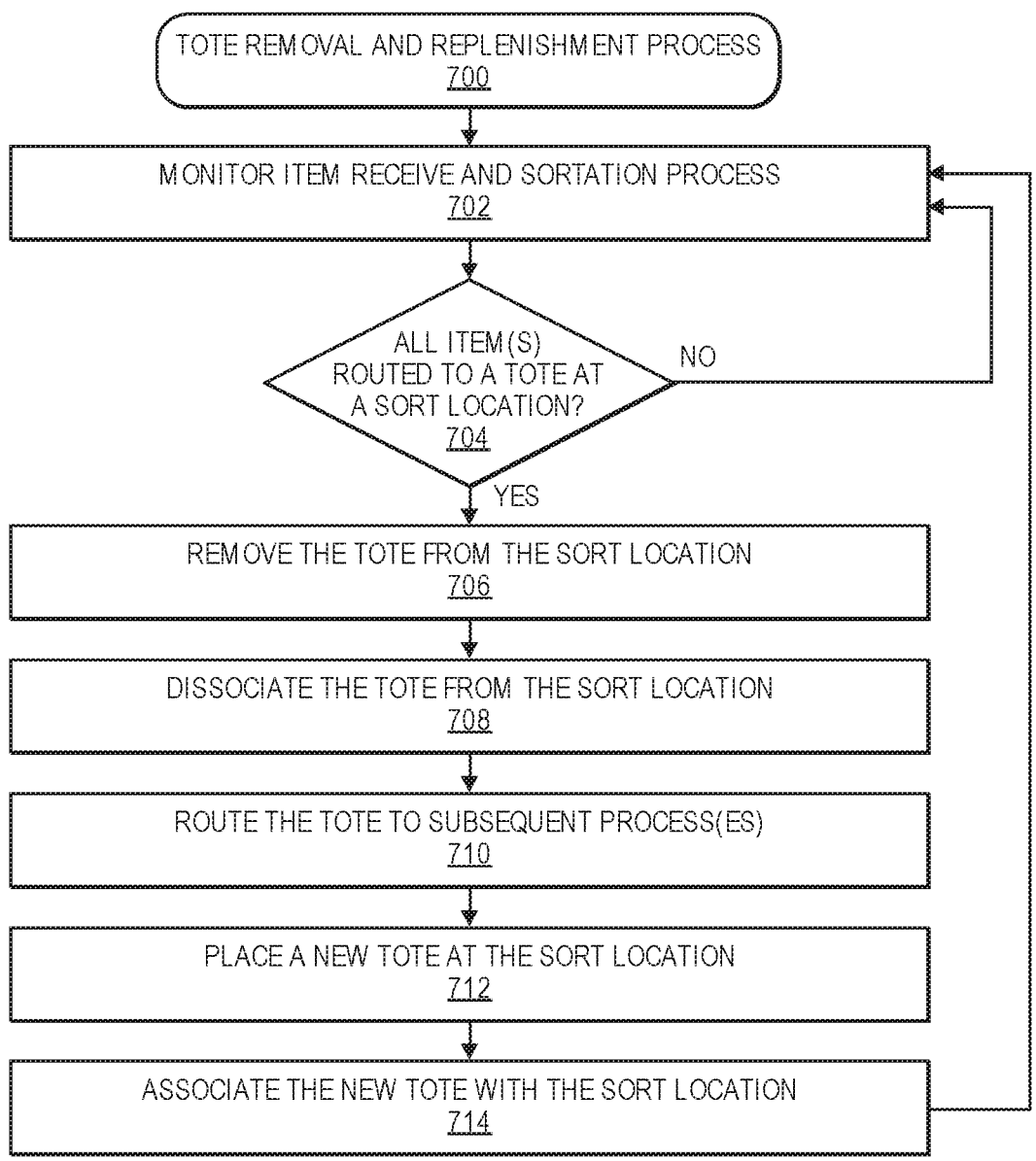
FIG. 7 is a flow diagram illustrating an example tote removal and replenishment process, according to an implementation.

FIG. 7 is a flow diagram illustrating an example tote removal and replenishment process 700, according to an implementation. The process 700 may begin, as in 702, by monitoring the item receive and sortation process 600 as described with respect to FIG. 6. During the monitoring, the process 700 may determine whether all items have been routed to a sortation container at a sortation position, as in 704. If there are no sortation containers that have received all items intended for the sortation containers, the process 700 may return to 702 and continue monitoring the item receive and sortation process 600.

If, however, a sortation container has received all items intended for the sortation container, the process 700 may proceed to remove the sortation container from the sortation position, as in 706. For example, a robotic arm or other mechatronic device may identify the sortation container within the sortation system, e.g., by detecting identifiers associated with cylindrical sortation towers, sortation levels, sortation positions, sortation containers, and/or items, and the robotic arm or other mechatronic device may then retrieve the sortation container. In addition, an identifier of the sortation container may be disassociated from an identifier of the sortation position, as in 708. Further, the robotic arm or other mechatronic device may route the sortation container to subsequent processes, as in 710. For example, the robotic arm or other mechatronic device may place the sortation container on a conveyor or other conveyance device to convey the sortation container to subsequent processes such as storage, picking, packing, shipping, or other processes.

The process 700 may continue by placing a new sortation container at the vacant sortation position, as in 712. For example, the same or a different robotic arm or mechatronic device may identify the new sortation container from a conveyor or other conveyance device, or from a stack of empty sortation containers otherwise made available to the process, e.g., by detecting an identifier of the new sortation container, and grasp and place the new sortation container at the vacant sortation position. In addition, an identifier of the new sortation container may be associated with the identifier of the sortation position, as in 714. The new sortation container may then be available to receive items within the sortation systems as described herein. The process 700 may then return to 702 to monitor the item receive and sortation process 600 for additional sortation containers that have received all items intended for the sortation containers.

Figure 8:
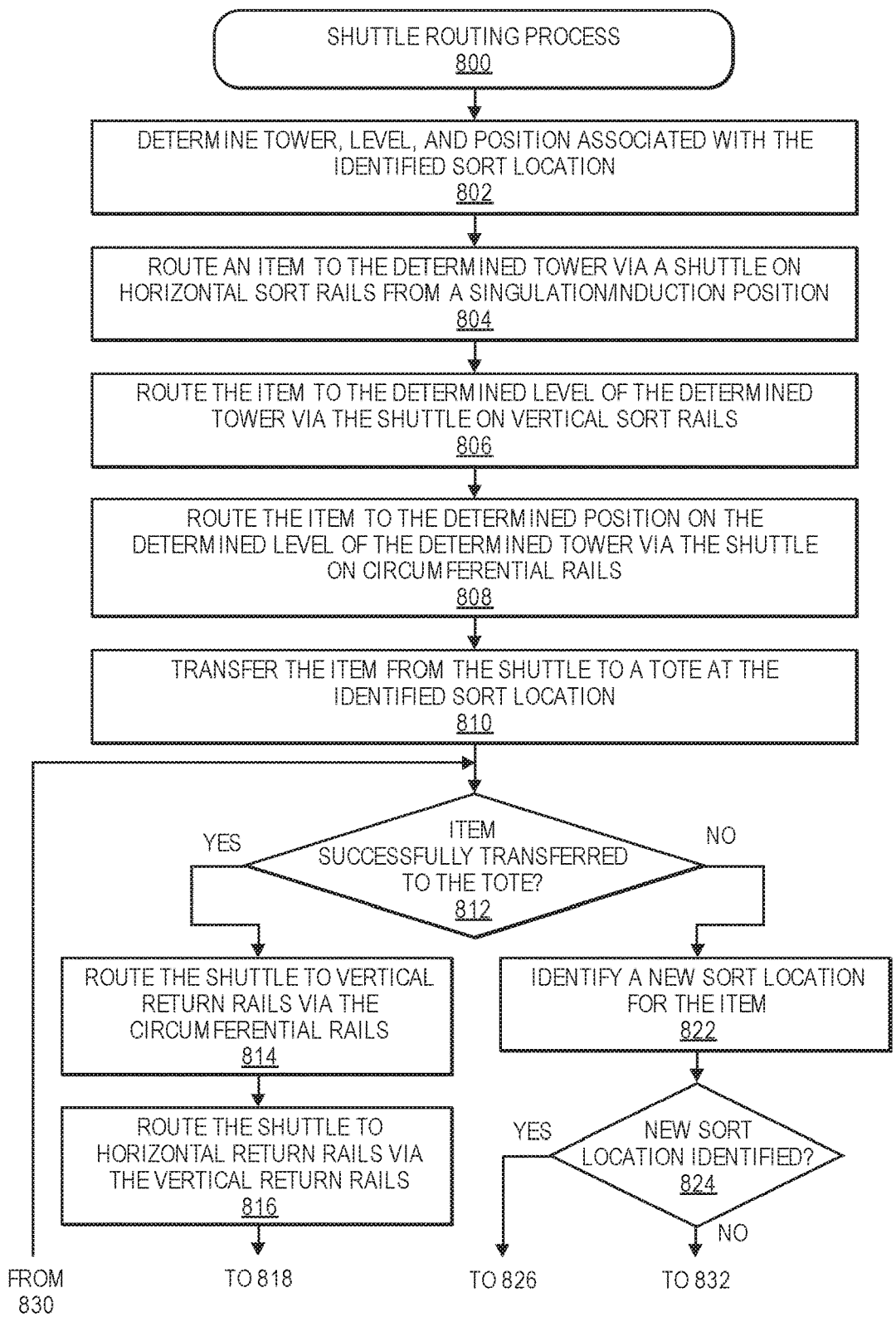
FIG. 8 is a flow diagram illustrating an example shuttle routing process, according to an implementation.
Figure 8:
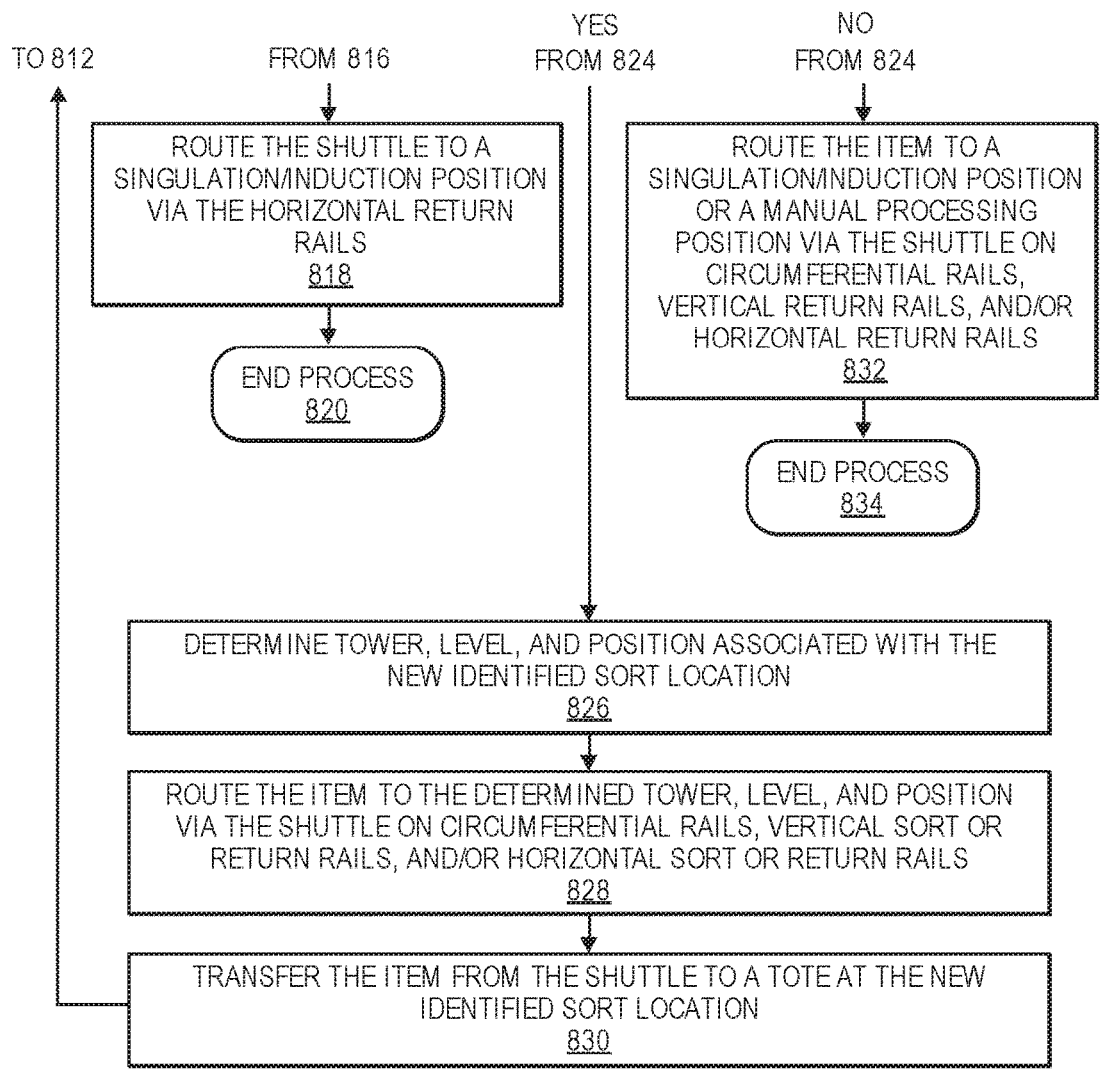

FIG. 8 is a flow diagram illustrating an example shuttle routing process 800, according to an implementation. The process 800 may begin by determining a cylindrical sortation tower, a sortation level, a sortation position, and/or a sortation container associated with a desired sort location for an item received by a shuttle, as in 802. As described herein, the cylindrical sortation tower, the sortation level, the sortation position, and the sortation container may have been previously determined, or the cylindrical sortation tower, the sortation level, the sortation position, and the sortation container may be determined upon identification of the item.

Then, the process 800 may continue by routing the item to the determined cylindrical sortation tower via the shuttle on horizontal sort rails or tracks from a singulation/induction station, as in 804, routing the item to the determined sortation level via the shuttle on vertical sort rails or tracks, as in 806, and routing the item to the determined sortation position via the shuttle on circumferential rails or tracks, as in 808. For example, the shuttle may travel on the various rails or tracks using the first and second sets of wheels, and identify its position based on detected identifiers on cylindrical sortation towers, sortation levels, sortation positions, sortation containers, and/or portions of the tracks. In addition, a control system of the shuttle and the sortation system controller may communicate in order to actuate the latch mechanisms of the vertical rails or tracks and movable sections of the circumferential rails or tracks on the sortation level at appropriate times, such that the shuttle may travel between the vertical rails or tracks and circumferential rails or tracks.

Upon the shuttle arriving at the determined sortation position, the process 800 may then proceed by transferring the item from the shuttle to the sortation container at the determined sortation position, as in 810. For example, the shuttle may actuate a conveyor belt or rollers on its upper surface to transfer the item to the sortation container, or a portion of the upper surface may raise and tilt such that the item slides into the sortation container.

Then, the process 800 may determine whether the item was successfully transferred to the sortation container, as in 812. For example, the sortation system and/or the shuttle may determine whether the item was successfully transferred using one or more sensors, such as imaging devices or sensors, scanning devices, radiofrequency identification readers, weight sensors, and/or pressure sensors. If the item was successfully transferred to the sortation container, then the process 800 may proceed to route the shuttle via the circumferential rails or tracks to vertical return rails or tracks, as in 814, route the shuttle via the vertical return rails or tracks to horizontal return rails or tracks, as in 816, and route the shuttle via the horizontal return rails or track to a singulation/induction station, as in 818. As described herein, the shuttle may travel on the various rails or tracks using the first and second sets of wheels, and identify its position based on detected identifiers on cylindrical sortation towers, sortation levels, sortation positions, sortation containers, and/or portions of the tracks. In addition, a control system of the shuttle and the sortation system controller may communicate in order to actuate the latch mechanisms of the vertical rails or tracks and movable sections of the circumferential rails or tracks on the sortation level at appropriate times, such that the shuttle may travel between the vertical rails or tracks and circumferential rails or tracks. Further, an identifier of the successfully transferred item may be associated with identifiers of the cylindrical sortation tower, the sortation level, the sortation position, and/or the sortation container, and the identifier of the item may be disassociated from the identifier of the shuttle. The process 800 may then end, as in 820, and repeat when the shuttle receives a new item for sortation.

If the item was not successfully transferred to the sortation container, as in 812, the process 800 may proceed to determine a new sort location for the item, as in 822. For example, if the sortation position and/or sortation container is not available or cannot be identified, the shuttle may not initiate transfer of the item. In addition, if the sortation container is full and cannot receive the item, the shuttle may not initiate transfer of the item or may not be able to transfer the item. The new sort location may be determined based on any characteristics of the item or the sortation system as described herein.

The process 800 then proceeds to determine whether a new sort location has been identified, as in 824. If a new sort location cannot be identified, then the process 800 may continue by routing the item back to a singulation/induction station or a manual processing area via the shuttle on the various rails and tracks, and/or one or more conveyors, robotic arms, or other mechatronic devices, as in 832. For example, the item may be manually sorted or otherwise re-inducted into the sortation system upon correction of any errors. The process 800 may then end, as in 834, and repeat when the shuttle receives a new item for sortation.

If a new sort location has been identified, as in 824, then the process 800 may continue by determining a cylindrical sortation tower, a sortation level, a sortation position, and/or a sortation container associated with the new sort location for the item, as in 826. Then, the process 800 may proceed by routing the item to the determined cylindrical sortation tower, the determined sortation level, the determined position, and/or the determined sortation container via the shuttle on the circumferential rails or tracks, the vertical return rails or tracks, the vertical sort rails or tracks, the horizontal return rails or tracks, and/or the horizontal sort rails or tracks, as in 828. As described herein, the shuttle may travel on the various rails or tracks using the first and second sets of wheels, and identify its position based on detected identifiers on cylindrical sortation towers, sortation levels, sortation positions, sortation containers, and/or portions of the tracks. In addition, a control system of the shuttle and the sortation system controller may communicate in order to actuate the latch mechanisms of the vertical rails or tracks and movable sections of the circumferential rails or tracks on the sortation level at appropriate times, such that the shuttle may travel between the vertical rails or tracks and circumferential rails or tracks.

The process 800 may then proceed by transferring the item from the shuttle to a sortation container at the new sort location, as in 830. The process 800 may then return to 812 to determine whether the item was successfully transferred to the sortation container at the new sort location. The process 800 may then continue from 812, as described herein, until the item is successfully transferred to a sort location and the shuttle returns to a singulation/induction station to receive a new item for sortation, or until the item is transferred to a singulation/induction station or manual processing area and the shuttle returns to a singulation/induction station to receive a new item for sortation. Further, an identifier of the successfully transferred item may be associated with identifiers of the cylindrical sortation tower, the sortation level, the sortation position, and/or the sortation container, and the identifier of the item may be disassociated from the identifier of the shuttle.

Figure 9:
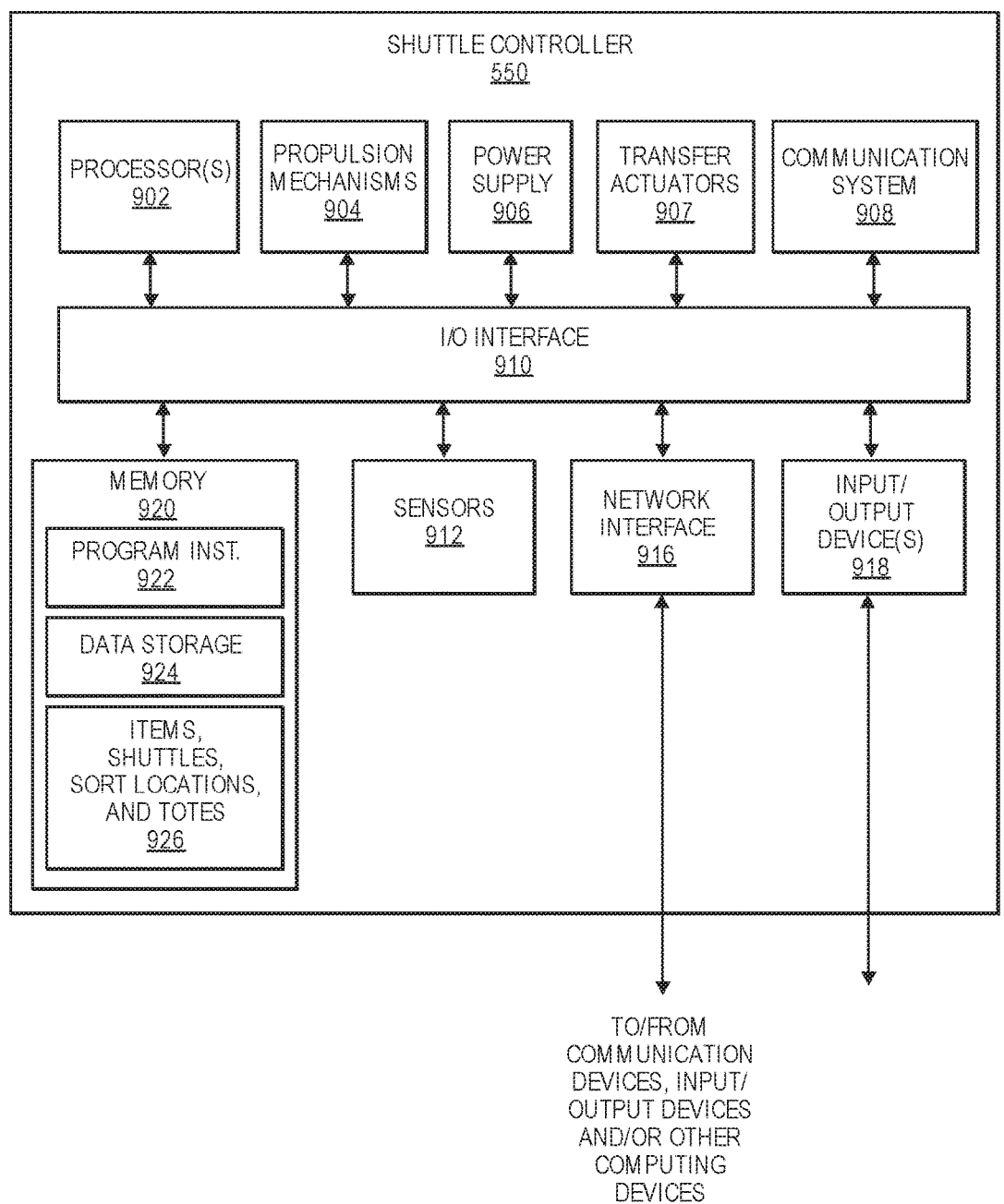
FIG. 9 is a block diagram illustrating various components of a shuttle controller, according to an implementation.

FIG. 9 is a block diagram illustrating various components of a shuttle controller 550, according to an implementation. In various examples, the block diagram may be illustrative of one or more aspects of the shuttle controller 550 that may be used to implement the various systems and processes discussed above. In the illustrated implementation, the shuttle controller 550 includes one or more processors 902, coupled to a non-transitory computer readable storage medium 920 via an input/output (I/O) interface 910. The shuttle controller 550 may also include propulsion mechanisms 904, a power supply 906, transfer actuators 907, and/or a communication system 908. The shuttle controller 550 further includes one or more sensors 912, a network interface 916, and one or more input/output devices 918.

In various implementations, the shuttle controller 550 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, item information, shuttle information, sort location information (e.g., cylindrical sortation towers, sortation levels, sortation positions, and sortation containers), container information, and/or other data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and items, shuttles, sort locations, and totes data and information 926, respectively. In other implementations, program instructions, data and/or items, shuttles, sort locations, and totes data and information may be received, sent, or stored upon different types of computer-accessible media, such as non-transitory media, or on similar media separate from the non-transitory computer readable storage medium 920 or the shuttle controller 550. Items, shuttles, sort locations, and totes data and information may include information related to characteristics, locations, identifiers, other associated identifiers, or other information of each of items, shuttles, sort locations, and totes.

Generally speaking, a non-transitory, computer readable storage medium may include storage media or memory media such as magnetic or optical media, e.g., disk or CD/DVD-ROM, coupled to the shuttle controller 550 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface 916, or other peripheral interfaces, such as input/output devices 918. In some implementations, the I/O interface 910 may perform any necessary protocol, timing, or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propulsion mechanisms 904 and transfer actuators 907 may be instructed by the processor(s) 902 and be operatively connected to the power supply 906 and the communication system 908 to route the shuttle to desired locations and transfer items to such desired locations. The communication system 908 may operate using any suitable communication methods or systems, including wired or wireless communication methods, satellite, cellular, ethernet, Wi-Fi, Bluetooth, or other communication methods.

The shuttle controller 550 may also include one or more sensors 912, such as imaging devices or sensors, scanning devices, radiofrequency identification readers, weight sensors, pressure sensors, or other sensors. The shuttle controller 550 may control and guide the operation and routing of the shuttle based on data received from the one or more sensors 912. For example, the sensors 912 may detect identifiers associated with various components of the system, including items, other shuttles, cylindrical sortation towers, sortation levels, sortation positions, sortation containers, and/or portions of the tracks in order to route the shuttle to desired locations within the sortation system.

Figure 10:
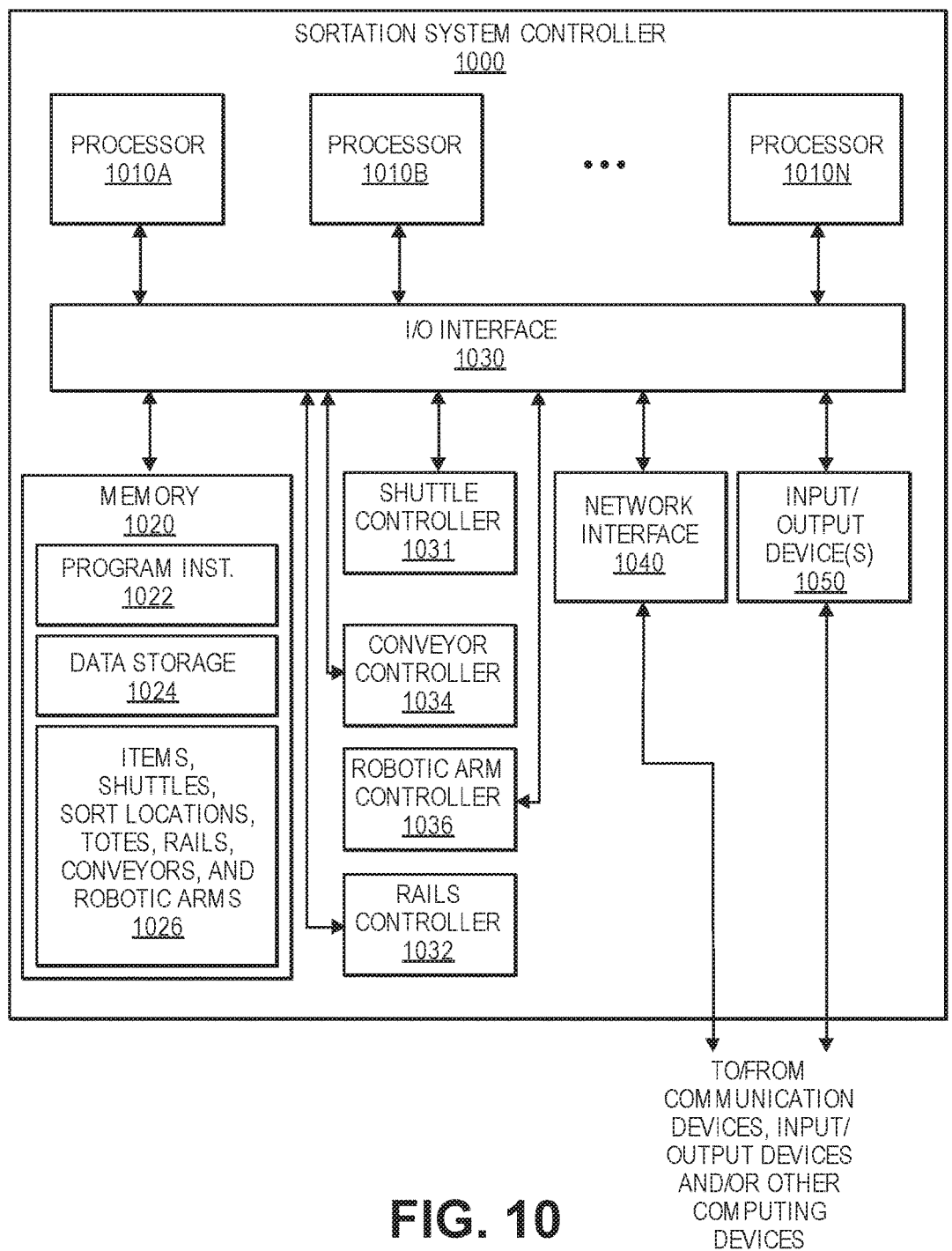
FIG. 10 is a block diagram illustrating various components of a sortation system controller, according to an implementation.

The network interface 916 may be configured to allow data to be exchanged between the shuttle controller 550, other devices attached to a network, such as other computer systems, shuttle controllers of other shuttles, and/or a sortation system controller as described herein with respect to FIG. 10. For example, the network interface 916 may enable wireless communication between numerous shuttles. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, image capture devices, thermal sensors, infrared sensors, time of flight sensors, radar, LIDAR, accelerometers, pressure sensors, etc. Multiple input/output devices 918 may be present and controlled by the shuttle controller 550. One or more of these devices may be utilized to assist in operations and routing of the shuttle within the sortation system.

FIG. 10 is a block diagram illustrating various components of a sortation system controller 1000, according to an implementation. Various operations of the sortation system controller 1000, such as those described herein, may be executed on one or more computer systems, interacting with various other devices, according to various implementations. In the illustrated implementation, the sortation system controller 1000 includes one or more processors 1010A, 1010B through 1010N, coupled to a non-transitory computer-readable storage medium 1020 via an input/output (I/O) interface 1030. The sortation system controller 1000 further includes a network interface 1040 coupled to the I/O interface 1030, and one or more input/output devices 1050. In some implementations, it is contemplated that the sortation system controller 1000 may be implemented using a single instance of the sortation system controller 1000, while in other implementations, multiple such systems or multiple nodes making up the sortation system controller 1000 may be configured to host different portions or instances of the sortation system controller 1000. For example, in one implementation, some data sources or services may be implemented via one or more nodes of the sortation system controller 1000 that are distinct from those nodes implementing other data sources or services. In some implementations, a given node may implement the functionality of more than one component of the sortation system controller 1000.

In various implementations, the sortation system controller 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 1020 as program instructions 1022, data storage 1024, and items, shuttles, sort locations (e.g., cylindrical sortation towers, sortation levels, sortation positions, and sortation containers), totes, rails, conveyors, and robotic arms data and information 1026, respectively. In other implementations, program instructions and/or data may be received, sent, or stored upon different types of computer-accessible media, such as non-transitory media, or on similar media separate from the non-transitory computer-readable storage medium 1020 or the sortation system controller 1000. Generally speaking, a non-transitory, computer-readable storage medium may include storage media or memory media such as magnetic or optical media, e.g., disk or CD/DVD-ROM coupled to the sortation system controller 1000 via the I/O interface 1030. Program instructions and data stored via a non-transitory computer-readable medium may be transmitted by transmission media or signals, such as electrical, electromagnetic, or digital signals, which may be conveyed via a communication medium, such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices in the device, including the network interface 1040 or other peripheral interfaces, such as input/output devices 1050. In some implementations, the I/O interface 1030 may perform any necessary protocol, timing, or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The sortation system controller 1000 may also include a shuttle controller 1031. The shuttle controller 1031 may communicate with a plurality of shuttles in order to receive, process, and/or store data received from the shuttles, and to provide data and/or instructions to the shuttles to coordinate their routing and operations. The sortation system controller 1000 may also include a rails controller 1032. The rails controller 1032 may communicate with a plurality of actuatable portions of rails, e.g., latch mechanisms of the vertical rails and movable sections of the circumferential rails, to coordinate operations of the actuatable portions of the rails with the operations of the shuttles, e.g., to allow shuttles to transition between vertical rails and circumferential rails on various sortation levels.

The sortation system controller 1000 may also include a conveyor controller 1034 and a robotic arm controller 1036. The conveyor and robotic arm controllers 1034, 1036 may communicate with a plurality of conveyors or other conveyance devices and a plurality of robotic arms or other mechatronic devices, respectively, in order to receive, process, and/or store data received from the conveyors or robotic arms, and to provide data and/or instructions to coordinate operations of the conveyors and robotic arms, e.g., at singulation/induction stations and/or tote removal and replenishment systems, with operations of other components of the sortation system.

The network interface 1040 may be configured to allow data to be exchanged between the sortation system controller 1000 and other devices attached to a network, such as other computer systems, the shuttle controllers 550 of shuttles described with respect to FIG. 9, actuatable portions of rails, conveyors, robotic arms, and/or other components of the sortation system. In various implementations, the network interface 1040 may support communication via wired or wireless general data networks, such as any suitable type of Ethernet network, Wi-Fi network, or other network. For example, the network interface 1040 may support communication via telecommunications/telephony networks such as satellite, cellular, analog, or digital networks, e.g., storage area networks such as Fibre Channel SANs, or via any other suitable type of network and/or protocol.

Input/output devices 1050 may, in some implementations, include one or more displays, buttons, keyboards, keypads, touchpads, mice, touchscreens, projection devices, visual interfaces, audio output devices, audio interfaces, voice or optical recognition devices, image capture devices, scanning devices, thermal sensors, infrared sensors, time of flight sensors, accelerometers, weight sensors, pressure sensors, other types of sensors described herein, other types of input/output devices described herein, or any other devices suitable for entering, receiving, or retrieving data by the sortation system controller 1000. Multiple input/output devices 1050 may be present in the sortation system controller 1000 or may be distributed on various nodes of the sortation system controller 1000. In some implementations, similar input/output devices may be separate from the sortation system controller 1000 and may interact with one or more nodes of the sortation system controller 1000 through a wired or wireless connection, such as over the network interface 1040.

As shown in FIG. 10, the computer-readable storage medium 1020 may include program instructions 1022 which may be configured to implement a sortation system controller, data storage 1024 which may comprise various tables, databases, and/or other data structures accessible by the program instructions 1022, and data and information related to items, shuttles, sort locations, totes, rails, conveyors, and robotic arms 1026. In one implementation, the program instructions 1022 may include various software modules configured to implement and coordinate operations of the various components of the sortation system controller 1000. The data storage 1024 and other data 1026 may include various data stores for maintaining control and coordination between the various components of the sortation system controller 1000, such as data representing operations, characteristics, locations, identifiers, other associated identifiers, or other information of each of items, shuttles, sort locations, totes, rails, conveyors, and robotic arms.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the shuttle controller 550 and the sortation system controller 1000 are merely illustrative and are not intended to limit the scope of the present disclosure. In particular, the computing system and devices may include any combination of hardware or software that can perform the indicated functions, including computers, network devices, internet appliances, PDAs, wireless phones, pagers, etc. The shuttle controller 550 and the sortation system controller 1000 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the shuttle controller 550 and/or the sortation system controller 1000. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the shuttle controller 550 and the sortation system controller 1000 may be transmitted to the shuttle controller 550 and the sortation system controller 1000 via transmission media or signals, such as electrical, electromagnetic, or digital signals, conveyed via a communication medium, such as a network and/or a wireless link. Various implementations may further include receiving, sending, or storing instructions and/or data implemented in accordance with the foregoing description upon a computer-accessible medium. Accordingly, the techniques described herein may be practiced with other shuttle controller and sortation system controller configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A cylindrical sortation system, comprising:
a cylindrical sortation tower comprising:
horizontal sort rails and horizontal return rails connected between the cylindrical sortation tower and an induction station;
a plurality of sortation levels;
vertical sort rails connected to the horizontal sort rails and extending through each of the plurality of sortation levels;
vertical return rails connected to the horizontal return rails and extending through each of the plurality of sortation levels;
a plurality of sortation positions arranged circumferentially around a periphery of each of the plurality of sortation levels, each sortation position associated with a respective sortation tote; and
circumferential rails connected between the vertical sort rails and the vertical return rails on each of the plurality of sortation levels, the circumferential rails extending adjacent each of the plurality of sortation positions of a respective sortation level;
a shuttle configured to transfer an item from the induction station to a respective sortation tote via the horizontal sort rails, the vertical sort rails, and the circumferential rails, and configured to return to the induction station via the circumferential rails, the vertical return rails, and the horizontal return rails; and
a robotic arm configured to remove the respective sortation tote from a respective sortation position, and configured to place a new tote at the respective sortation position.

2. The cylindrical sortation system of claim 1, wherein the cylindrical sortation system comprises a plurality of cylindrical sortation towers, each of the plurality of cylindrical sortation towers connected to the induction station via respective horizontal sort rails and horizontal return rails.

3. The cylindrical sortation system of claim 1, wherein the cylindrical sortation system comprises a plurality of shuttles, each of the plurality of shuttles configured to transfer a respective item from the induction station to a respective sortation tote independently of others of the plurality of shuttles.

4. The cylindrical sortation system of claim 1, wherein the cylindrical sortation system comprises a plurality of robotic arms, each of the plurality of robotic arms configured to remove and place totes at respective sortation positions independently of others of the plurality of robotic arms.

5. A sortation system, comprising:
a cylindrical sortation tower comprising:
a horizontal track connected between the cylindrical sortation tower and an induction station;
at least one sortation level;
a vertical track connected to the horizontal track and extending to the at least one sortation level;
a plurality of sortation positions arranged circumferentially around a periphery of the at least one sortation level, each sortation position associated with a respective sortation container; and
a circumferential track connected to the vertical track on the at least one sortation level and extending adjacent each of the plurality of sortation positions; and
a shuttle configured to transfer an item from the induction station to a respective sortation container via the horizontal track, the vertical track, and the circumferential track.

6. The sortation system of claim 5, wherein the shuttle is configured to traverse the horizontal track and the vertical track using a first set of wheels, and wherein the shuttle is configured to traverse the circumferential track using a second set of wheels.

7. The sortation system of claim 5, wherein the cylindrical sortation tower further comprises a connecting track between the vertical track and the circumferential track on the at least one sortation level;
wherein the vertical track includes at least one latch mechanism;
wherein the circumferential track includes at least one movable section; and
wherein the at least one latch mechanism and the at least one movable section are configured to transfer the shuttle between the vertical track and the circumferential track via the connecting track.

8. The sortation system of claim 5, wherein the shuttle is configured to maintain an upper surface that receives the item in a substantially horizontal configuration.

9. The sortation system of claim 8, wherein the upper surface of the shuttle includes at least one of a conveyor, rollers, or a tilt mechanism configured to transfer the item to the respective sortation container.

10. The sortation system of claim 5, wherein the shuttle includes a sensor configured to identify at least one of the cylindrical sortation tower, the at least one sortation level, a sortation position, or the respective sortation container, the sensor including at least one of an imaging sensor, a scanning device, or a radiofrequency identification reader.

11. The sortation system of claim 10, further comprising:
a controller configured to associate the item with the respective sortation container.

12. The sortation system of claim 5, further comprising:
a robotic arm configured to remove the respective sortation container from a respective sortation position, and configured to place a new container at the respective sortation position.

13. The sortation system of claim 12, wherein the robotic arm includes a sensor configured to identify at least one of the cylindrical sortation tower, the at least one sortation level, the respective sortation position, the respective sortation container, or the new container, the sensor including at least one of an imaging sensor, a scanning device, or a radiofrequency identification reader.

14. The sortation system of claim 12, further comprising:
a controller configured to dissociate the respective sortation container from the respective sortation position, and configured to associate the new container with the respective sortation position.

15. The sortation system of claim 5, wherein the sortation system includes a plurality of sortation levels, and a plurality of shuttles configured to independently transfer respective items from the induction station to respective sortation containers.

16. The sortation system of claim 5, wherein the sortation system includes a second horizontal track connected between the cylindrical sortation tower and a second induction station, wherein the second induction station is located adjacent to or on a different floor than the induction station.

17. A method of operating a sortation system, comprising:
identifying a sort location associated with an item received by a shuttle at an induction station;
determining at least one of a cylindrical sortation tower, a sortation level, a sortation position, or a sortation container associated with the identified sort location, wherein the cylindrical sortation tower comprises at least one sortation level including a plurality of sortation positions arranged circumferentially around a periphery of the at least one sortation level, each sortation position associated with a respective sortation container;
routing, via the shuttle, the item to the identified sort location based at least in part on the determined at least one of the cylindrical sortation tower, the sortation level, the sortation position, or the sortation container; and
transferring the item from the shuttle to the sortation container at the identified sort location.

18. The method of claim 17, further comprising:
routing the shuttle back to the induction station; and
receiving, by the shuttle at the induction station, a new item to be sorted in the sortation system.

19. The method of claim 17, further comprising:
determining that the item was not transferred from the shuttle to the sortation container at the identified sort location;
identifying a new sort location associated with the item carried by the shuttle;
determining at least one of a new cylindrical sortation tower, a new sortation level, a new sortation position, or a new sortation container associated with the identified new sort location;
routing, via the shuttle, the item to the identified new sort location; and
transferring the item from the shuttle to the new sortation container at the identified new sort location.

20. The method of claim 17, further comprising:
removing, by a robotic arm, the sortation container from the sortation position;
routing the sortation container to a subsequent process associated with the item; and
placing, by the robotic arm, a new sortation container at the sortation position.

\* \* \* \* \*